United States Patent
Sadakane et al.

(10) Patent No.: US 12,162,329 B2
(45) Date of Patent: Dec. 10, 2024

(54) VEHICLE

(71) Applicant: AGC Inc., Tokyo (JP)

(72) Inventors: Shunsuke Sadakane, Tokyo (JP); Yusuke Nishizawa, Tokyo (JP); Yuhei Gima, Tokyo (JP); Risa Kimura, Tokyo (JP)

(73) Assignee: AGC Inc., Tokyo (JP)

( * ) Notice: Subject to any disclaimer, the term of this patent is extended or adjusted under 35 U.S.C. 154(b) by 220 days.

(21) Appl. No.: 17/451,344

(22) Filed: Oct. 19, 2021

(65) Prior Publication Data

US 2022/0032744 A1 Feb. 3, 2022

Related U.S. Application Data

(63) Continuation of application No. PCT/JP2020/017650, filed on Apr. 24, 2020.

(30) Foreign Application Priority Data

May 7, 2019 (JP) .................. 2019-087853

(51) Int. Cl.
*B60J 1/08* (2006.01)
*B32B 7/023* (2019.01)
*B32B 17/10* (2006.01)

(52) U.S. Cl.
CPC .................. *B60J 1/08* (2013.01); *B32B 7/023* (2019.01); *B32B 17/10431* (2013.01);
(Continued)

(58) Field of Classification Search
CPC ...... B60J 1/08; B32B 7/023; B32B 17/10431; B32B 17/10633; B32B 17/10669;
(Continued)

(56) References Cited

U.S. PATENT DOCUMENTS 9,921,463 B2    3/2018  Tao et al.
9,946,147 B2    4/2018  Ide et al.
(Continued)

FOREIGN PATENT DOCUMENTS

JP    5752834 B1    7/2015
JP    6065221 B2    1/2017
(Continued)

*Primary Examiner* — Balram T Parbadia
*Assistant Examiner* — Gabriel A Sanz
(74) *Attorney, Agent, or Firm* — Oblon, McClelland, Maier & Neustadt, L.L.P.

(57) ABSTRACT

The present vehicle includes a projection device installed in the vehicle; and a laminated glass configured to transmit a light beam emitted from the projection device to a vehicle exterior side. The laminated glass includes a vehicle-interior-side glass plate; a vehicle-exterior-side glass plate; an interlayer bonding the vehicle-interior-side glass plate and the vehicle-exterior-side glass plate; and a scattering layer arranged between the vehicle-exterior-side glass plate and the vehicle-interior-side glass plate, and in contact with the interlayer, the scattering layer being configured to be irradiated with the light beam. A relationship between visible light transmittance Tv (%) of the laminated glass and an angle of incidence θ (degrees) to the scattering layer of each ray included in the light beam incident on the scattering layer satisfies Formula (1) described in the description.

20 Claims, 9 Drawing Sheets

(52) U.S. Cl.
CPC .. *B32B 17/10633* (2013.01); *B32B 17/10669* (2013.01); *B32B 2307/422* (2013.01); *B32B 2309/105* (2013.01); *B32B 2605/006* (2013.01)

(58) Field of Classification Search
CPC ........ B32B 2307/422; B32B 2309/105; B32B 2605/006; B32B 2307/418; B32B 3/04; B32B 17/10018; B32B 17/10504; B32B 17/10623; B32B 17/10761; B32B 17/10036
See application file for complete search history.

(56) References Cited

U.S. PATENT DOCUMENTS

| | | | | |
|---|---|---|---|---|
| 2006/0291030 | A1* | 12/2006 | Niiyama | G02F 1/133502 359/237 |
| 2008/0112058 | A1* | 5/2008 | Matsushita | G02B 27/0101 359/630 |
| 2010/0177383 | A1* | 7/2010 | Kamada | C03C 17/42 977/773 |
| 2010/0285280 | A1* | 11/2010 | Yonekura | B32B 17/10788 428/174 |
| 2015/0122406 | A1* | 5/2015 | Fisher | B32B 17/10743 156/222 |
| 2016/0137883 | A1* | 5/2016 | Igarashi | B32B 27/06 428/343 |
| 2016/0229735 | A1 | 8/2016 | Akada | |
| 2017/0059982 | A1 | 3/2017 | Watanabe et al. | |
| 2017/0075207 | A1 | 3/2017 | Tao et al. | |
| 2018/0250918 | A1* | 9/2018 | Schall | B32B 17/10788 |
| 2018/0348516 | A1* | 12/2018 | Sadakane | G02B 27/0101 |
| 2021/0001696 | A1* | 1/2021 | Arndt | B32B 17/1066 |
| 2022/0091414 | A1* | 3/2022 | Cappuccilli | B60J 1/001 |

FOREIGN PATENT DOCUMENTS

| | | |
|---|---|---|
| JP | 2017-090617 A | 5/2017 |
| JP | 6350656 B2 | 7/2018 |
| JP | 6477026 B2 | 3/2019 |
| WO | WO 2015/088026 A1 | 6/2015 |
| WO | WO 2015/186630 A1 | 12/2015 |

* cited by examiner

150

151 152 154 153

VEHICLE

CROSS-REFERENCE TO RELATED APPLICATIONS

This U.S. non-provisional application is a continuation application of and claims the benefit of priority under 35 U.S.C. § 365(c) from PCT International Application PCT/JP2020/017650 filed on Apr. 24, 2020, which is designated the U.S., and is based upon and claims the benefit of priority of Japanese Patent Application No. 2019-087853 filed on May 7, 2019, the entire contents of which are incorporated herein by reference.

TECHNICAL FIELD

The present disclosure relates to a vehicle.

BACKGROUND ART

As window glass for vehicles, there are cases where a laminated glass having a scattering layer such as a transparent screen film or the like enclosed, is used.

As types of transparent screen film, there are: a reflective transparent screen film that displays a light beam projected from a projection device as an image that can be visually recognized by an observer on the same side as the projection device; and a transmissive transparent screen film that displays a light beam projected from the projection device as an image that can be visually recognized by an observer on the opposite side of the projection device.

As the transmissive transparent screen film, for example, a transmissive transparent screen film that has a scattering layer including a transparent resin and a light scattering material between a first transparent substrate and a second transparent substrate, may be considered. In this transmissive transparent screen film, a light beam that is projected from the projection device and incident on a surface on a first transparent substrate side is scattered in the scattering layer, to form an image, so as to be displayed as an image that can be visually recognized by an observer on the opposite side of the projection device (see, for example, Japanese Patent No. 5752834 (Patent Document 1)).

However, in the case of using a laminated glass having a scattering layer such as a transparent screen film or the like enclosed as the window glass for a vehicle, to make a light beam that is emitted from a projection device installed inside the vehicle and projected on the laminated glass, visible as an image, the means of improving visibility has not been studied sufficiently.

SUMMARY

According to an embodiment, a vehicle includes a projection device installed in the vehicle; and a laminated glass configured to transmit a light beam emitted from the projection device to a vehicle exterior side. The laminated glass includes a vehicle-interior-side glass plate; a vehicle-exterior-side glass plate; an interlayer bonding the vehicle-interior-side glass plate and the vehicle-exterior-side glass plate; and a scattering layer arranged between the vehicle-exterior-side glass plate and the vehicle-interior-side glass plate, and in contact with the interlayer, the scattering layer being configured to be irradiated with the light beam. A relationship between visible light transmittance Tv (%) of the laminated glass and an angle of incidence θ (degrees) to the scattering layer of each ray included in the light beam incident on the scattering layer satisfies Formula (1) described in the description.

EMBODIMENTS OF THE INVENTION

According to an embodiment of the disclosure, for a vehicle that has a laminated glass to transmit a light beam emitted from a projection device installed in the vehicle to the vehicle exterior side, the visibility of an image from the outside of the vehicle can be improved.

In the following, embodiments for carrying out the inventive concept will be described with reference to the drawings. Throughout the drawings, the same elements are assigned the same reference codes, and duplicated description may be omitted.

Also, in some of the drawings, the size and shape may be partially exaggerated to facilitate understanding of the contents of the present inventive concept.

Also, in the following description, it is assumed that "plan view" refers to viewing a predetermined area of a laminated glass in a direction normal to the principal surface of the laminated glass, and a "planar shape" refers to a shape of the predetermined area of the laminated glass viewed in the direction normal to the principal surface of the laminated glass.

Note that in the following, although an automobile will be taken as an example for the description, the vehicle according to the present inventive concept is not limited to an automobile, and can be a mobile body in which a projection system that includes a projection device, and a window glass on which the projection device projects an image, are installed. As such a mobile body, a train, a ship, an aircraft, and the like may be enumerated.

First Embodiment

[Automobile]

Figure 1:
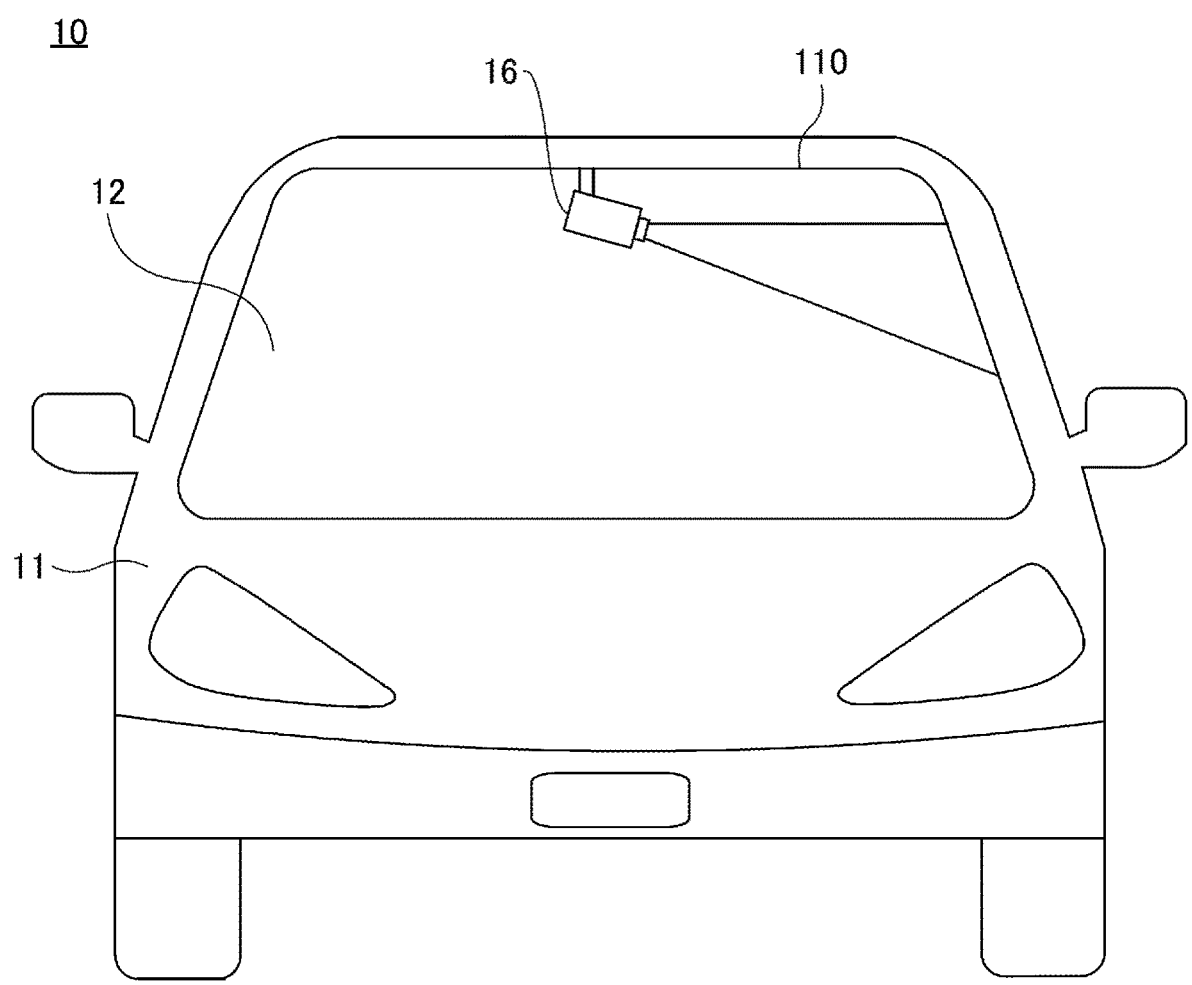
FIG. 1 is a front view exemplifying an automobile according to a first embodiment.
Figure 2:
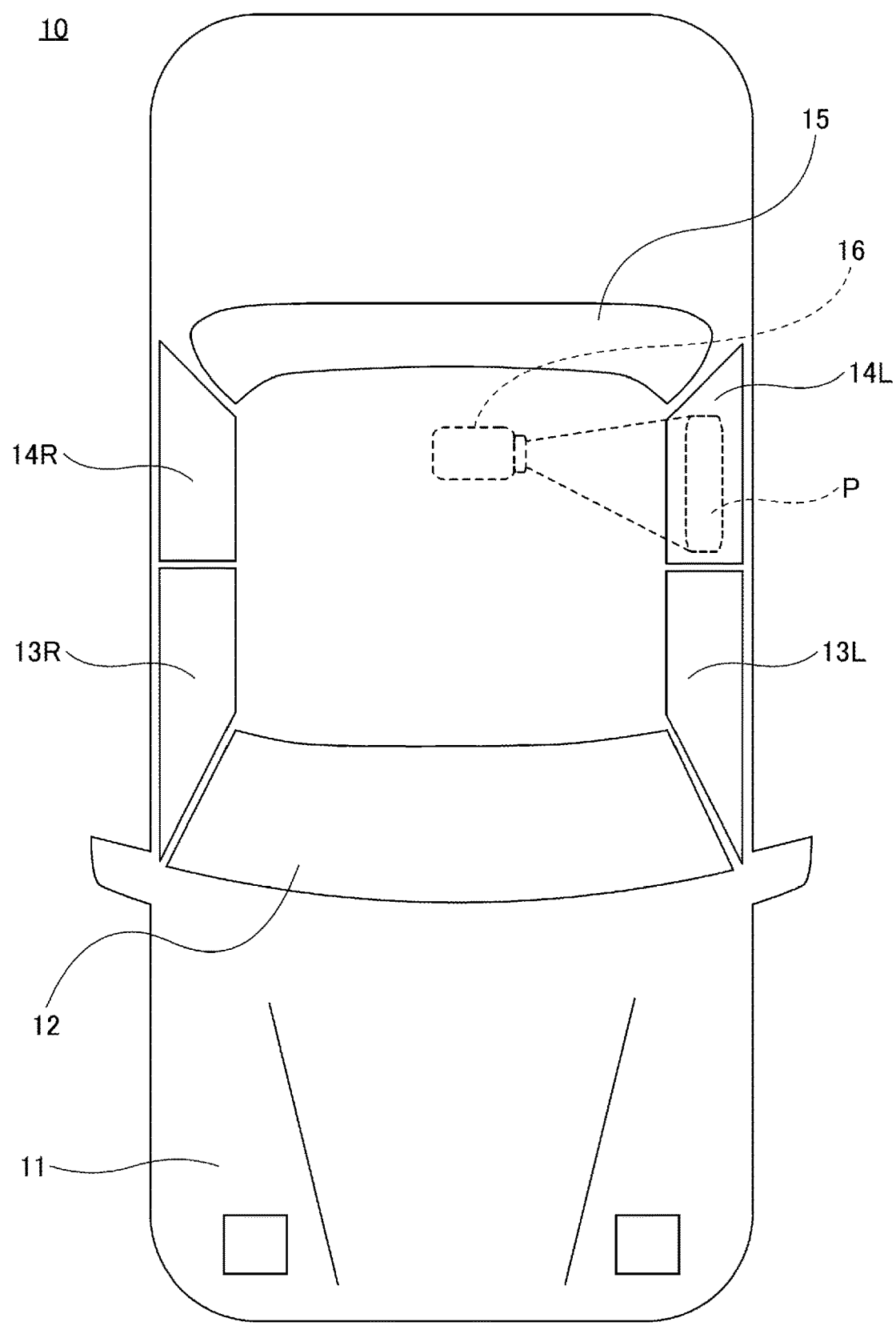
FIG. 2 is a top view exemplifying the automobile according to the first embodiment.

FIG. 1 is a front view exemplifying an automobile according to a first embodiment; FIG. 2 is a top view exemplifying the automobile according to the first embodiment; and FIG. 3 is a partial side view exemplifying the automobile according to the first embodiment, and illustrates a vicinity of a rear seat on the passenger seat side of the vehicle which is right-hand drive.

Figure 3:
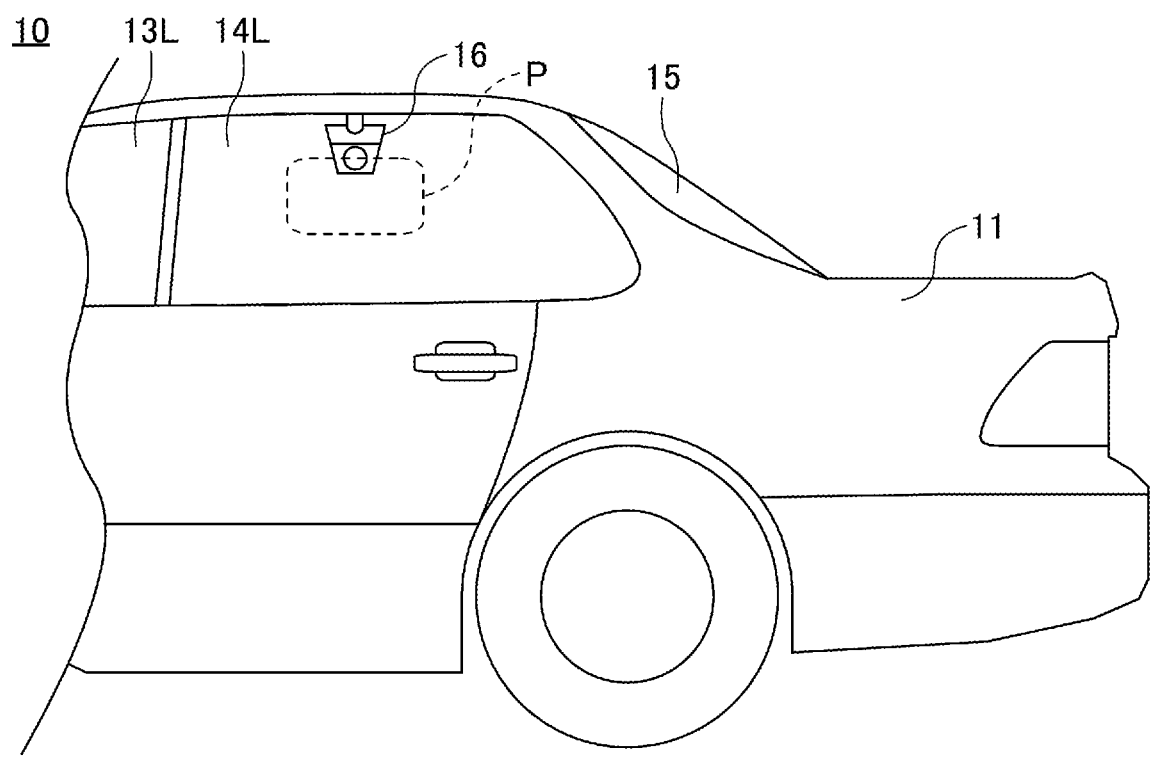
FIG. 3 is a partial side view exemplifying the automobile according to the first embodiment.

As illustrated in FIGS. 1 to 3, an automobile 10 includes a windshield 12 provided in an opening 110 of a vehicle body 11, front side glasses 13R and 13L, rear side glasses 14R and 14L, and a rear glass 15. The automobile 10 may include other window glasses, for example, roof glass, front vent glass, rear quarter glass, and the like.

Also, the automobile 10 has a projection device 16 in the vehicle interior. The projection device 16 can be installed at any position inside the automobile 10 as long as it does not interfere with an occupant on board, and can be attached, for example, on the vehicle interior side of the roof of the vehicle body 11. By an operation performed by an occupant of the automobile 10, the projection device 16 can project a predetermined image that can be visually recognized from the outside of the automobile 10, on one of the window glasses present in the automobile 10.

In this way, in the automobile 10, a projection system that includes the projection device 16, and a window glass on which the projection device 16 projects a predetermined image that can be visually recognized from the outside of the automobile 10, are installed.

The projection device 16 is not limited in particular; for example, an LCD projector, a DLP (Digital Light Processing) projector, and the like may be enumerated. The predetermined image is not limited in particular, and includes, for example, an advertisement presented toward the outside of the vehicle, letters and characters that indicate information presented toward the outside of the vehicle (indication on an intention such as right turning or left turning, destination display, etc.).

In the present embodiment, although an example will be described in which the projection device 16 projects a predetermined image P on the rear side glass 14L, it is not limited as such. For example, the projection device 16 may project the image on the rear side glass 14R or the rear glass 15, or may project the image on any area of the windshield 12 or the front side glass 13R or 13L, as long as the projection does not interfere with the field of vision of the driver.

Also, the projection device 16 may be configured to be movable, and as necessary, may project the image selectively on a required location, for example, the rear side glass 14R or the rear side glass 14L. Also, the automobile 10 may have multiple projection devices 16 installed.

Note that although the automobile 10 has a variety of known devices and equipment other than those described above, for example, power sources such as an engine and motors, transmissions, suspensions, and ECUs (Electronic Control Units), and the like, components necessary for the description of the embodiments according to the present inventive concept are extracted and presented here.

[Window Glass]

Figure 4:
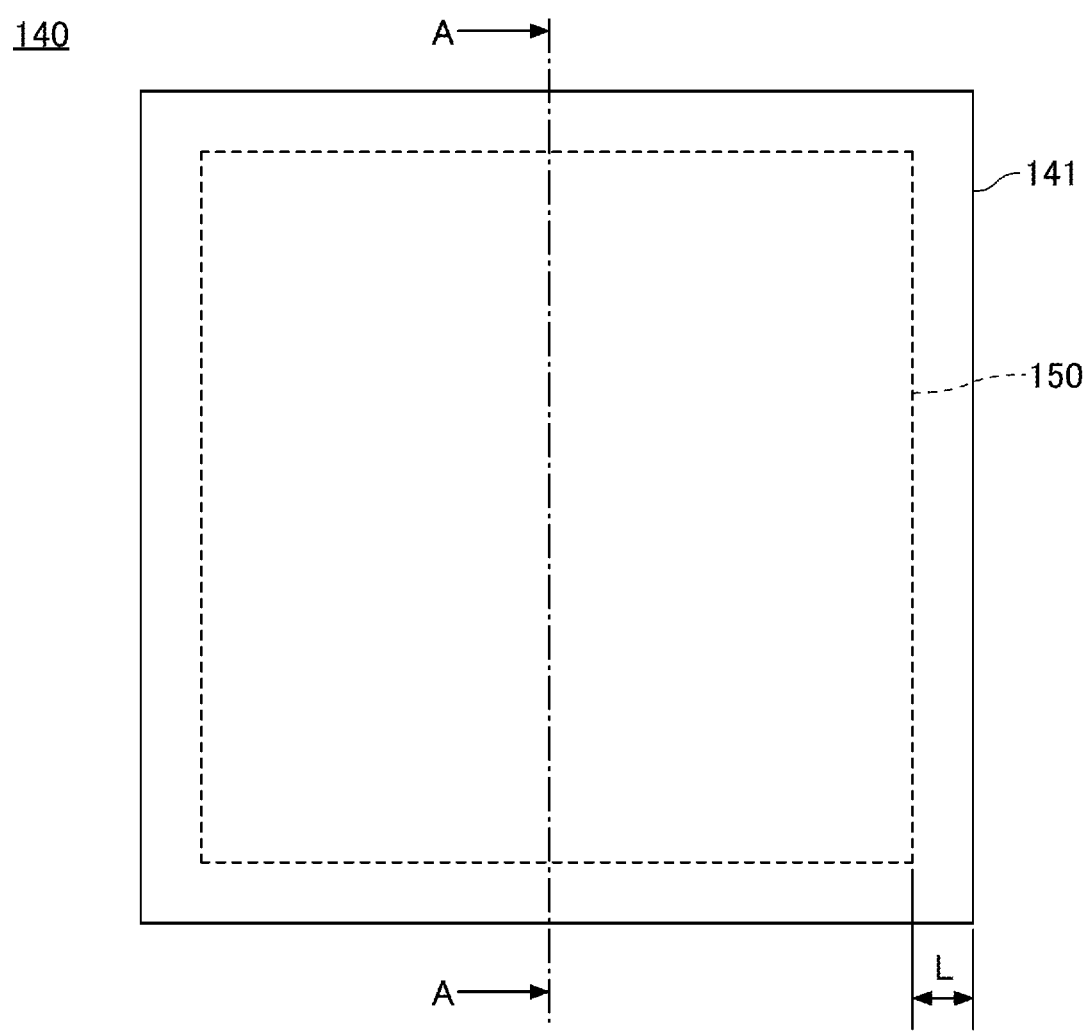
FIG. 4 is a plan view exemplifying a laminated glass according to the first embodiment.
Figure 5:
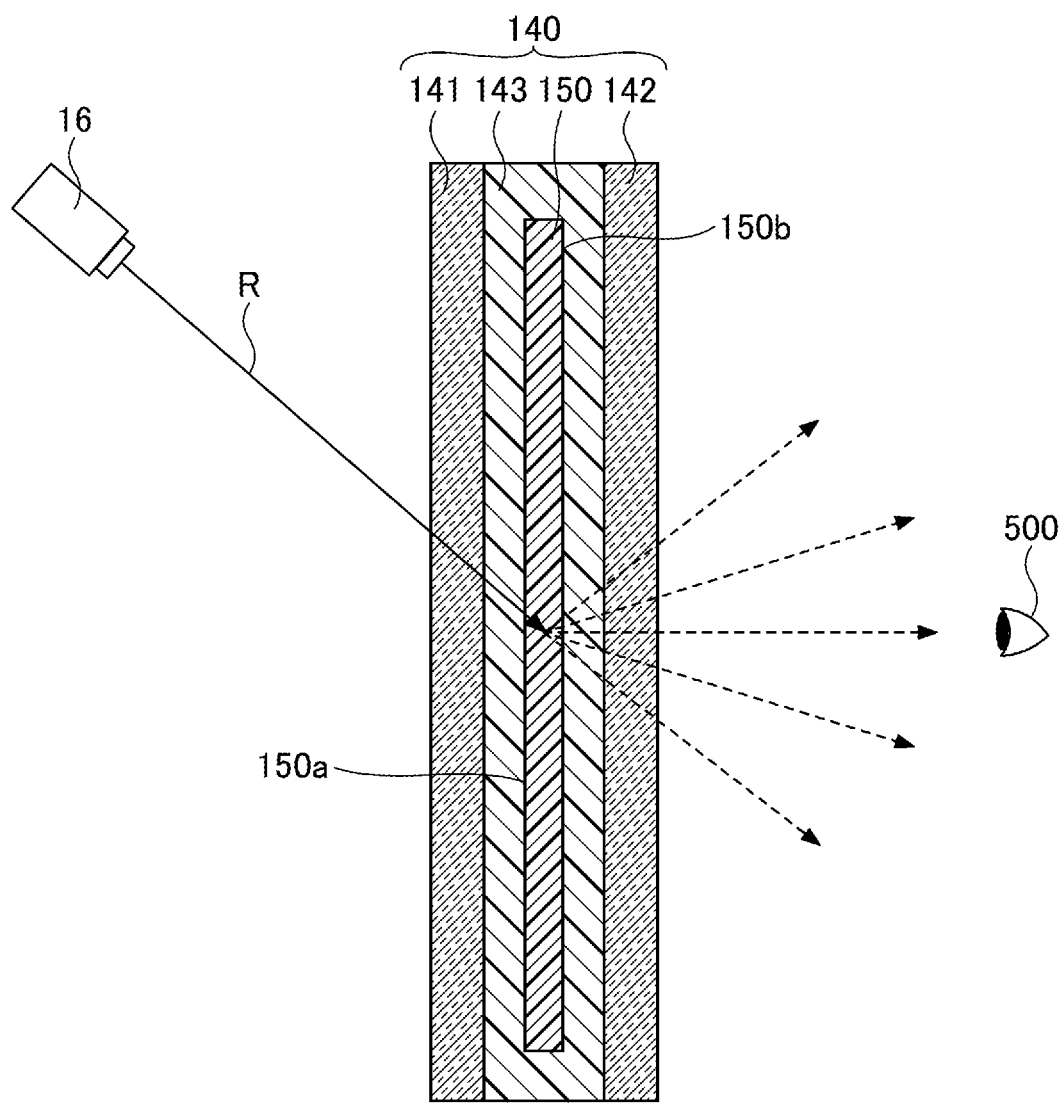
FIG. 5 is a cross sectional view exemplifying the laminated glass according to the first embodiment.

In the present embodiment, the window glass on which an image is displayed toward the outside of the vehicle is a laminated glass. FIG. 4 is a plan view exemplifying the laminated glass according to the first embodiment; and FIG. 5 is a cross sectional view exemplifying the laminated glass according to the first embodiment, and illustrates a cross section along a line A-A in FIG. 4. In FIGS. 4 and 5, for the sake of convenience of description, the laminated glass 140 is illustrated with omitting an actual curved shape, and with simplifying the outward form to be illustrated as a rectangular shape.

In the present embodiment, as an example, the laminated glass 140 is applied to the rear side glass 14L. In this case, a light beam from the projection device 16 installed in the vehicle with which the laminated glass 140 as the rear side glass 14L is irradiated, transmits toward the vehicle exterior side, and can be viewed as an image from the outside of the vehicle.

As illustrated in FIGS. 4 and 5, the laminated glass 140 includes a glass plate 141, a glass plate 142, an interlayer 143, and a scattering layer 150.

The glass plate 141 is a vehicle-interior-side glass plate that comes on the vehicle interior side when the laminated glass 140 is attached as the rear side glass 14L to the automobile 10. Also, the glass plate 142 is a vehicle-exterior-side glass plate that comes on the vehicle exterior side when the laminated glass 140 is attached as the rear side glass 14L to the automobile 10. The glass plates 141 and 142 may have predetermined curvatures.

The glass plate 141 and the glass plate 142 are a pair of glass plates opposite to each other, and the interlayer 143 and the scattering layer 150 are positioned between the pair of glass plates. The glass plate 141 and the glass plate 142 are fixed in a state of having the interlayer 143 and the scattering layer 150 interposed in-between. Note that the surface on the vehicle interior side of the glass plate 141 and the surface on the vehicle exterior side of the glass plate 142 are the principal surfaces of the laminated glass 140.

The interlayer 143 bonds the glass plate 141 and the glass plate 142. The interlayer 143 may include multiple interlayers. The interlayer 143 may include, for example, an interlayer bonded to the glass plate 141, an interlayer bonded to the glass plate 142, and a frame-shaped interlayer positioned between these interlayers to surround the periphery of the scattering layer 150. The glass plate 141, the glass plate 142, and the interlayer 143 will be described in detail later.

The scattering layer 150 is a layer provided for making a light beam emitted by the projection device 16 visible as an image from the outside of the vehicle, and arranged in contact with the interlayer 143. The scattering layer 150 may be arranged in contact with the interlayer 143 and the glass plate 141 and/or the glass plate 142. The scattering layer 150 may have a thickness of, for example, greater than or equal to 3 µm and less than or equal to 800 µm. As long as the thickness of the scattering layer 150 is within this range, sufficient scattering is obtained. The thickness of the scattering layer 150 is more favorably greater than or equal to 10 µm and less than or equal to 800 µm, and further favorably greater than or equal to 25 µm and less than or equal to 800 µm.

The outer peripheral edges of the scattering layer 150 may be aligned with at least part of the outer peripheral edges of the laminated glass 140. In other words, a distance L illustrated in FIG. 4 may be 0 mm at part of the scattering layer 150, or may be 0 mm along the entire periphery. If the distance L illustrated in FIG. 4 is 0 mm, the outer peripheral edge of the scattering layer 150 cannot be visually recognized at that part, and is favorable in terms of external appearance.

The outer peripheral edges of the scattering layer 150 may be positioned inward the laminated glass 140 from the outer peripheral edges of the laminated glass 140. For example, it is favorable to be positioned inward the laminated glass 140 by greater than or equal to 5 mm from the peripheral edge of the laminated glass 140. In other words, it is favorable that the distance L illustrated in FIG. 4 is at least greater than or equal to 5 mm with respect to at least part of the scattering layer 150. This arrangement protects the scattering layer 150 sufficiently, and improves the durability of the scattering layer 150. Note that the durability of the scattering layer 150 is improved when the distance L is greater than 0 mm.

On the other hand, when the entire periphery of the laminated glass 140 is supported by the frame of the vehicle, it is favorable that the outer peripheral edges of the scattering layer 150 are not visible from the vehicle interior side. For example, it is favorable that the distance L illustrated in FIG. 4 is less than or equal to 50 mm along the entire periphery of the scattering layer 150. In the case where the laminated glass 140 is used for a slidable window, it is favorable that, along the periphery of the laminated glass 140, part that becomes visible or invisible depending on the sliding amount has the distance L illustrated in FIG. 4 being less than or equal to 10 mm. This is because the frame of the vehicle that supports the slidable window has a width around 10 mm.

The scattering layer 150 has an irradiation surface 150a to be irradiated with a light beam from the projection device 16, and an image displaying surface 150b as a surface opposite to the irradiation surface 150a, to display the light beam from the projection device 16 toward the outside of the vehicle. Note that in the present specification, a light beam means a bundle of rays of light (light ray beam). FIG. 5 illustrates a representative ray of light R included in a light beam emitted from the projection device 16. Also, the ray of light R may correspond to an optical axis having the strongest light intensity in the light beam.

A light beam from the projection device 16 with which the irradiation surface 150a of the scattering layer 150 is irradiated, is scattered in the scattering layer 150 to form an image, and displayed on the image displaying surface 150b that is positioned on the opposite side of the irradiation surface 150a from the projection device 16, as an image that can be visually recognized by an observer 500. Note that the observer 500 is an occupant of another vehicle, a pedestrian, or the like.

Also, the light of a scene on the projection device 16 side of the laminated glass 140 is partially scattered in the scattering layer 150, and the rest of the light is transmitted. Therefore, in the case where the irradiation surface 150a is not irradiated with a light beam from the projection device 16, the observer 500 can see the scene on the projection device 16 side through the laminated glass 140.

The scattering layer 150 is, for example, a transparent screen film, a light control film, a scattering coating, a fluorescent film, or a fluorescent coating. The scattering layer 150 may include two or more of these. As the light control film, for example, SPD (Suspended Particle Device), PDLC (Polymer Dispersed Liquid Crystal), GHLC (Guest Host Liquid Crystal), electrochromic device, photochromic device, thermochromic device, and the like may be enumerated. Note that in the case where the scattering layer 150 is a scattering coating or fluorescent coating, the scattering layer 150 is provided on one or both of the surface of the glass plate 141 on the interlayer 143 side, and the surface of the glass plate 142 on the interlayer 143 side.

It is favorable that the scattering layer 150 is excellent in terms of isotropic scattering. From this point of view, it is favorable that a transparent screen film or a PDLC being excellent in terms of isotropic scattering is used as the scattering layer 150. A transparent screen film that will be described below with reference to FIGS. 6 and 7 has better isotropic scattering than a PDLC, and hence, is particularly favorable as the scattering layer 150. Note that isotropic scattering is a property of uniformly scattering incident light in all directions.

In the following, with reference to FIGS. 6 and 7, a transparent screen film will be described as an example of the scattering layer 150.

Figure 6:
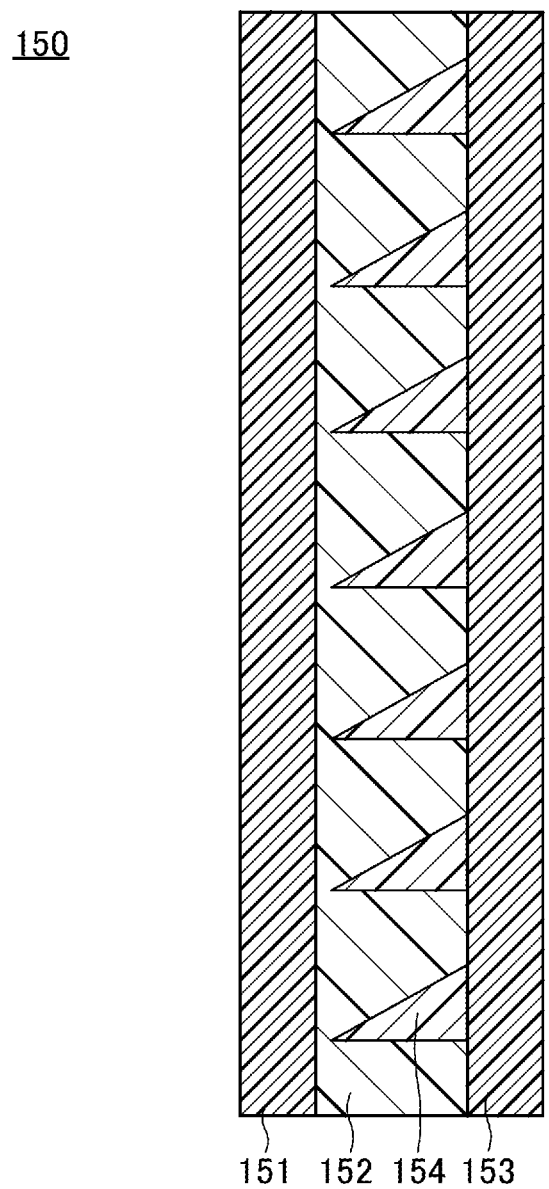
FIG. 6 is a cross sectional view illustrating a first example of a scattering layer.

FIG. 6 is a cross sectional view illustrating a first example of a scattering layer. As illustrated in FIG. 6, the scattering layer 150 is a transparent screen film, and includes a transparent resin film 151, a transparent layer 152 provided over the transparent resin film 151, and a transparent substrate 153 provided over the transparent layer 152. In the transparent layer 152, multiple light scattering parts 154 are formed in stripes to extend in one dimension, to be substantially parallel with the principal surface of the transparent layer 152. Note that the scattering layer 150 is arranged so as to have the transparent resin film 151 come on the vehicle interior side, and the transparent substrate 153 come on the vehicle exterior side.

It is favorable that the cross section perpendicular to the extending direction of the light scattering part 154 has a shape of a triangle, trapezoid, bell, or the like. Such a structure in which multiple light scattering parts 154 are formed in stripes to extend in one dimension may be referred to as a louver structure. Therefore, in the present embodiment, the multiple light scattering parts 154 are linearly formed inside the transparent layer 152, and the light scattering parts 154 are arranged to have predetermined intervals.

It is favorable that the intervals of the light scattering parts 154 are arranged such that the shape of the transparent layer 152 formed between adjacent light scattering parts 154 is longer than it is wide with respect to the thickness direction of the transparent layer 152. In other words, it is favorable that the interval of adjacent light scattering parts 154 is smaller than the thickness of the transparent layer 152.

The transparent layer 152 can be formed of, for example, a resin having visible light transmittance of 50 to 100%. As such resins, for example, photocurable resins such as acrylic resins, epoxy resins, urethane acrylate resins, and the like; thermosetting resins; and thermoplastic resins may be enumerated. When the scattering layer 150 is enclosed in the interlayer 143 of the laminated glass 140, in order to maintain a sense of transparency so as not to impair the function as a window, the yellow index of the resin constituting the transparent layer 152 is favorably less than or equal to 10 or less, and more favorably less than or equal to 5.

The thickness of the transparent layer 152 is favorably greater than or equal to 10 μm and less than or equal to 200 μm. In the case where the light scattering parts 154 have a louver structure as illustrated in FIG. 6, as long as the thickness of the transparent layer 152 is greater than or equal to 10 μm, the interval is also greater than or equal to 10 μm, and the effect of the louver structure can be fully exhibited. Also, as long as the thickness of the transparent layer 152 is less than or equal to 200 μm, the thickness can be easily controlled, and production by a roll-to-roll process becomes easy.

Also, if the thickness of the transparent layer 152 is greater than or equal to 10 μm and less than or equal to 200 μm, in the case where light is incident on the surface on the vehicle interior side of the glass plate 141 at an angle of 45 degrees, it becomes easier to control the intensity of backward scattered light to be lower than the intensity of forward scattered light. As a result, when the scattering layer 150 is enclosed in the interlayer 143 of the laminated glass 140, the visibility of a light beam from the projection device 16 with which the laminated glass 140 is irradiated as an image from the outside of the vehicle, can be improved.

The light scattering parts 154 may be formed of a transparent resin containing a light scattering material, or a transparent resin containing a light scattering material and a light absorbing material. As the transparent resin used for the light scattering parts 154, for example, photocurable resins such as acrylic resins and epoxy resins, thermosetting resins, thermoplastic resins, and the like may be enumerated. The transparent resin used in the light scattering parts 154 may be the same as or different from the transparent resin used for the transparent layer 152.

As the light scattering material contained in the light scattering parts 154, fine particles of a material having a high refractive index such as titanium oxide (refractive index being 2.5 to 2.7), zirconium oxide (refractive index being 2.4), aluminum oxide (refractive index being 1.76), or the like; fine particles of a material having a low refractive index such as porous silica (refractive index being less than or equal to 1.25), hollow silica (refractive index being less than or equal to 1.25), or the like; resin materials having a low compatibility and a different refractive index with respect to the transparent resin described above; crystallized resin materials of less than or equal to 1 μm; and the like may be enumerated. By using such a light scattering material, it becomes easier to set the forward haze and the backward haze of the scattering layer 150 when enclosed in the interlayer 143 of the laminated glass 140 to favorable values, for example, a forward haze of greater than or equal to 4 and less than or equal to 40, and a backward haze of greater than or equal to 0 to less than or equal to 60.

As the light absorbing material contained in the light scattering parts 154, carbon black, titanium black, or the like can be used. The concentration of the light absorbing material contained in the light scattering parts 154 is favorably greater than or equal to 0.01 vol % and less than or equal to 10 vol %, and more favorably greater than or equal to 0.1 vol % and less than or equal to 3 vol %.

Also, the optical density (OD value) at the maximum height of the light scattering part 154 is favorably within a range of 0.05 to 2, and more favorably within a range of 0.1 to 1. Also, in particular, considering visibility in the presence of external light, absorption in the light scattering part 154 is favorably greater than or equal to 5%, and more favorably greater than or equal to 10%.

Note that by having the light absorbing material contained in the light scattering part 154, when the scattering layer 150 is enclosed in the interlayer 143 of the laminated glass 140, part of the light that transmits through the laminated glass 140 as unnecessary stray light can be absorbed. Therefore, a phenomenon of cloudy appearance in the laminated glass 140 can be suppressed, and the contrast of a projected image can be improved. In particular, the effect of contrast improvement is more likely to be obtained in the case where an environment having brightness of greater than or equal to 100 lux caused by external light is present in the sight of an observer.

The transparent substrate 153 may be glass or transparent resin, and transparent resin is favorable. As the glass constituting the transparent substrate 153, soda-lime glass or alkali-free glass is favorable. Chemical tempering, hard coating, or the like may be applied to these glasses to improve durability. As the transparent resin constituting the transparent substrate 153, photocurable resins such as acrylic resins and epoxy resins, thermosetting resins, thermoplastic resins, and the like may be enumerated. It is favorable that the transparent resin constituting the transparent substrate 153 is the same as the transparent resin constituting the transparent layer 152.

The thickness of the transparent substrate 153 is favorably greater than or equal to 0.05 mm and less than or equal to 10 mm, more favorably greater than or equal to 0.05 mm and less than or equal to 5 mm, even more favorably greater than or equal to 0.05 mm and less than or equal to 1 mm, particularly favorably greater than or equal to 0.05 mm and less than or equal to 0.3 mm, and most favorably greater than or equal to 0.1 mm and less than or equal to 0.2 mm. If the thickness of the transparent substrate 153 is less than 0.05 mm, handling becomes difficult in the enclosing step, and if the thickness is greater than 10 mm, the flexural rigidity increases, and hence, enclosing it in the laminated glass becomes difficult.

Figure 7:
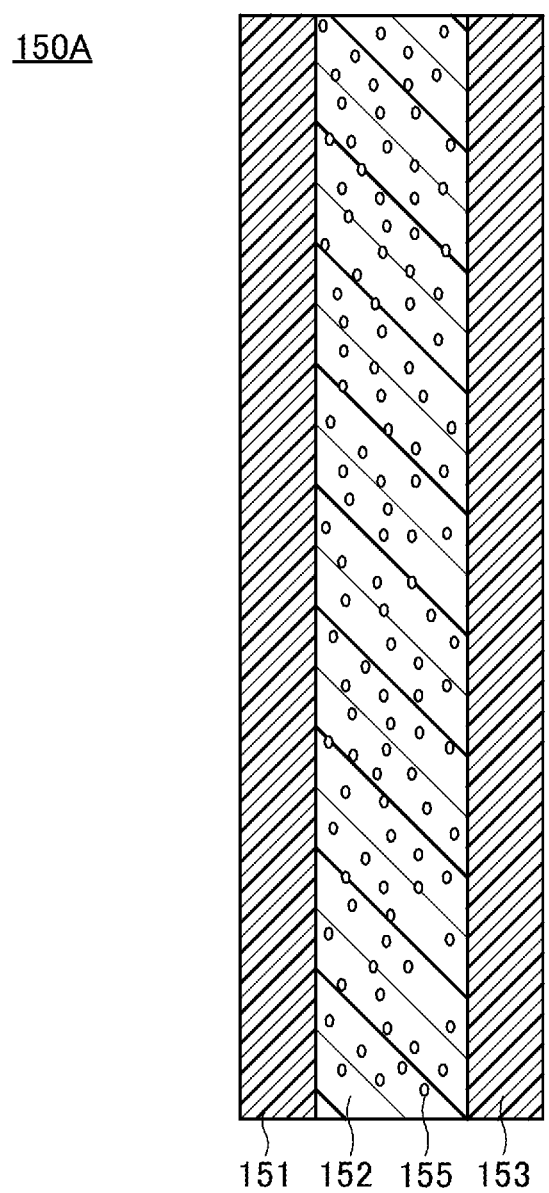
FIG. 7 is a cross sectional view illustrating a second example of a scattering layer.

FIG. 7 is a cross sectional view illustrating a second example of a scattering layer. As in a scattering layer 150A as illustrated in FIG. 7, a structure may be adopted in which light scattering particles 155 are dispersed in the transparent layer 152. Note that the scattering layer 150A is arranged so as to have the transparent resin film 151 come on the vehicle interior side, and the transparent substrate 153 come on the vehicle exterior side, when the laminated glass 140 is attached to the automobile 10.

The light scattering particles 155 may be fine particles of a high refractive index material such as titanium oxide, zirconium oxide, or aluminum oxide; or fine particles of a low refractive index material such as porous silica or hollow silica, as described above. In this case, if the size of the particles in terms of the center value of the distribution is the same as or a bit smaller than the wavelength of light to be scattered, probability of the incident light being scattered forward increases, and the function of scattering the incident light without refraction is strengthened; therefore, the size as such is favorable in that it can suppress distortion of a background image. Also, as the quantity of light does not change abruptly, an effect is obtained in improving the transparency of the scattering layer 150A.

The mean value of the particle diameter of the light scattering particles 155 is favorably greater than or equal to 25 nm and less than or equal to 1000 nm, more favorably greater than or equal to 50 nm and less than or equal to 1000 nm, and even more favorably greater than or equal to 100 nm and less than or equal to 800 nm. As long as the mean particle diameter of the light scattering particles 155 is within the range described above, the intensity of backward scattered light can be adjusted to be lower than the intensity of forward scattered light.

Note that the scattering layer 150A may be constituted with a light scattering material that does not contain the light scattering particles 155. In the case where the scattering layer 150A is constituted with a light scattering material that does not contain the light scattering particles 155, by adopting a configuration in which two types of materials having different refractive indices come into contact with an uneven interface viewed in cross section of the scattering layer 150A, the intensity of backward scattered light can be adjusted to be lower than the intensity of forward scattered light.

Note that when external light is incident on the laminated glass 140 provided with the scattering layer 150A, the external light transmits within the scattering layer 150A to be scattered, and emitted from the laminated glass 140, and thereby, in some cases, the contrast of a projected image and the background may be reduced.

Thereupon, in the case of the structure illustrated in FIG. 7, the scattering layer 150A may contain a light absorbing material. By having the light absorbing material contained in the scattering layer 150A, the phenomenon in that the contrast of an image and the background is reduced due external light emitted from unnecessary portions can be suppressed, and thereby, good visibility can be maintained.

As the light absorbing material, carbon black, titanium black, or the like can be used. The concentration of the light absorbing material contained in the scattering layer 150A is favorably greater than or equal to 0.01 vol % and less than or equal to 5 vol %, and more favorably greater than or equal to 0.1 vol % and less than or equal to 3 vol %. The quantity of light absorbed by the light absorbing material is favorably greater than or equal to 0.5%, more favorably greater than or equal to 5%, and even more favorably greater than or equal to 10%, with respect to light incident on the scattering layer 150A perpendicularly.

Also, by having the quantity of light absorbed by the light absorbing material be less than or equal to 90%, the quantity of light of a projected image can be used appropriately, and hence, it is favorable; it is more favorable to be less than 75%, and even more favorable to be less than 50%.

Note that the scattering layers illustrated in FIGS. 6 and 7 are described in detail in, for example, Japanese patent No. 6350656, the contents of which may be incorporated herein by reference.

Here, the glass plate 141, the glass plate 142, and the interlayer 143 will be described in detail.

[Glass Plates]

The glass plates 141 and 142 may be inorganic glass or may be organic glass. As the inorganic glass, for example, soda-lime glass, aluminosilicate glass, borosilicate glass, alkali-free glass, quartz glass, and the like can be used without specific restrictions. The glass plate 142 that is positioned on the outside of the laminated glass 140 is favorably inorganic glass from the viewpoint of scratch resistance, or soda-lime glass from the viewpoint of moldability. In the case where the glass plate 141 and the glass plate 142 are soda-lime glass, as the suitable glass, clear glass, green glass containing iron components by a predetermined amount or greater, and UV-cut green glass can be used.

The inorganic glass may be either of non-tempered glass or tempered glass. Non-tempered glass is obtained by forming molten glass into a plate, and then, annealing the plate. Tempered glass is glass having a compression stress layer formed on the surface of non-tempered glass.

The tempered glass may be either of physically tempered glass such as, for example, thermally tempered glass, or chemically tempered glass. In the case of physically tempered glass, by an operation other than annealing, such as rapidly cooling down a glass plate that has been uniformly heated during bend forming from a temperature around the softening point so as to generate a compression stress on the glass surface by difference in temperature between the glass surface and the glass interior, the glass surface can be tempered.

In the case of chemically tempered glass, for example, after bend forming, by generating a compression stress on the glass surface by an ion exchange method or the like, the glass surface can be tempered. Also, glass that absorbs ultraviolet rays or infrared rays may be used, and the glass is further favorable to be transparent; however, a glass plate that is colored to an extent not impairing the transparency may be used.

On the other hand, as the organic glass, transparent resins such as polycarbonate; acrylic resin, for example, polymethyl methacrylate and the like; polyvinyl chloride; polystyrene; and the like, may be enumerated.

The shape of the glass plates 141 and 142 is not specifically limited to a rectangular shape, and may be a shape processed to have various shapes and curvatures. For the bend forming of the glass plates 141 and 142, gravity forming, press forming, roller forming, or the like is used. Although the forming method of the glass plates 141 and 142 is also not limited in particular, for example, in the case of inorganic glass, it is favorable that a glass plate is formed by a float process or the like.

It is favorable that the plate thickness of the glass plate 142 is greater than or equal to 1.1 mm and less than or equal to 3 mm at the thinnest portion. If the plate thickness of the glass plate 142 is greater than or equal to 1.1 mm, the strength in terms of the stone-chip resistance or the like is sufficient; and if the thickness is less than or equal to 3 mm, the mass of the laminated glass 140 is not too large, and it is favorable in terms of the fuel efficiency of the vehicle. The plate thickness of the glass plate 142 is more favorably greater than or equal to 1.8 mm and less than or equal to 2.8 mm, further more favorably greater than or equal to 1.8 mm and less than or equal to 2.6 mm, further more favorably greater than or equal to 1.8 mm and less than or equal to 2.2 mm, and further more favorably greater than or equal to 1.8 mm and less than or equal to 2.0 mm, at the thinnest portion.

It is favorable that the plate thickness of the glass plate 141 is greater than or equal to 0.3 mm and less than or equal to 2.3 mm. The plate thickness of the glass plate 141 being greater than or equal to 0.3 mm makes the handling better, and the plate thickness being less than or equal to 2.3 mm makes the mass not too heavy.

Also, the glass plates 141 and 142 may have a flat shape or may have a curved shape. In the case where the glass plates 141 and 142 have curved shapes, and the plate thickness of the glass plate 141 is not appropriate, if two glass plates that have particularly deep bends are molded as the two glass plates 141 and 142, a mismatch would occur between the shapes of the two plates, which greatly affects the glass quality including the residual stress after pressure joining.

However, by setting the plate thickness of the glass plate 141 to be greater than or equal to 0.3 mm and less than or equal to 2.3 mm, the glass quality including the residual stress can be maintained. Setting the plate thickness of the glass plate 141 to be greater than or equal to 0.3 mm and less than or equal to 2.3 mm, is particularly effective in maintaining the glass quality for deeply curved glass. The plate thickness of the glass plate 141 is more favorably greater than or equal to 0.5 mm and less than or equal to 2.1 mm, and further more favorably greater than or equal to 0.7 mm and less than or equal to 1.9 mm. In these ranges, the effects described above are even more notable.

In the case where the laminated glass 140 is used for, for example, a head-up display, the plate thickness of the glass plates 141 and 142 does not need to be constant, and may vary from place to place as necessary. For example, in the case where the laminated glass 140 is a windshield, one or both of the glass plates 141 and 142 may have a wedge shape in cross section, in which the plate thickness becomes greater from the lower end toward the upper end of the windshield in a state of the windshield being attached to the vehicle. In this case, as long as the film thickness of the interlayer 143 is constant, the sum of the wedge angles of the glass plate 141 and the glass plate 142 may be varied, for example, within a range of greater than 0 mrad and less than or equal to 1.0 mrad.

Films having functions of water-repellency, or of cutting ultraviolet rays or infrared rays, or films having a low-reflectance characteristic or a low-emissivity characteristic may be provided on the outside of the glass plates 141 and/or 142. Also, on the side of the glass plates 141 and/or 142 contacting the interlayer 143, films for cutting ultraviolet rays or infrared rays, of a low-emissivity characteristic, for absorbing visible light absorption, for coloring, and the like may be provided.

In the case where the glass plates 141 and 142 are inorganic glass having a curved shape, after the glass plates 141 and 142 have been formed by a float process or the like, bend forming is applied before being adhered to the interlayer 143. The bend forming is performed by heating and softening the glass. The heating temperature of the glass during the bend forming is favorably controlled to be within a range of approximately 550° C. to 700° C.

[Interlayer]

As the interlayer 143, a thermoplastic resin is frequently used, and as thermoplastic resins conventionally used for this type of application, for example, plasticized polyvinyl acetal-based resin, plasticized polyvinyl chloride-based resin, saturated polyester-based resin, plasticized saturated polyester-based resin, polyurethane-based resin, plasticized polyurethane-based resin, ethylene-vinyl acetate copolymer-based resin, ethylene-ethyl acrylate copolymer-based resin, cycloolefin polymer resin, ionomer resin, and the like may be enumerated. Also, a resin composition that contains a modified block copolymer hydride described in Japanese Patent No. 6065221 can also be suitably used.

Among these, a plastic polyvinyl acetal-based resin is suitably used because it has a superior balance of properties including transparency, weather resistance, strength, adhesive strength, penetration tolerance, impact energy absorption, moisture resistance, heat insulation, and acoustic insulation. One of these thermoplastic resins may be used alone, or two or more types may be used in combination. Note that "plastic" in the "plastic polyvinyl acetal-based resin" described above means having been plasticized by adding a plasticizer. The same applies to the other plastic resins.

However, in the case where a film or the like is enclosed in the interlayer 143, depending on the type of material to be enclosed, it may be degraded by a specific plasticizer; in such a case, it is favorable that a resin that does not substantially contain the plasticizer is used. In other words, in some cases, it is favorable that the interlayer 143 does not contain a plasticizer. As the resin that does not contain a plasticizer, for example, ethylene-vinyl acetate copolymer-based resin, and the like may be enumerated.

As the polyvinyl acetal-based resin described above, polyvinyl formal resin obtained by having polyvinyl alcohol (hereafter, referred to as "PVA" as necessary) react with formaldehyde; polyvinyl acetal-based resin in a narrow sense obtained by having PVA react with acetaldehyde; and polyvinyl butyral resin (hereafter, referred to as "PVB" as necessary) obtained by having PVA react with n-butylaldehyde; and the like may be enumerated. In particular, PVB is recommended as the suitable one because of its superior balance of properties including transparency, weather resistance, strength, adhesive strength, penetration tolerance, impact energy absorption, moisture resistance, heat insulation, and acoustic insulation. Note that one of these polyvinyl acetal-based resins may be used alone, or two or more types may be used in combination.

However, the material forming the interlayer 143 is not limited to a thermoplastic resin. Also, the interlayer 143 may contain functional particles such as infrared absorbers, ultraviolet absorbers, luminescent agents, and the like; and coloring matters (pigments and dyes). Also, the interlayer 143 may have a colored portion called a shade band.

It is favorable that the film thickness of the interlayer 143 at the thinnest portion is greater than or equal to 0.5 mm. If the film thickness of the interlayer 143 is greater than or equal to 0.5 mm, impact resistance required for a laminated glass becomes sufficient. Also, it is favorable that the film thickness of the interlayer 143 at the thickest portion is less than or equal to 3 mm. If the maximum value of the film thickness of the interlayer 143 is less than or equal to 3 mm, the mass of the laminated glass does not become too heavy. The maximum value of the film thickness of the interlayer 143 is more favorably to be less than or equal to 2.8 mm, and further favorably to be less than or equal to 2.6 mm.

In the case where the laminated glass 140 is used for, for example, a head-up display, the film thickness of the interlayer 143 does not need to be constant, and may vary from place to place as necessary. For example, in the case where the laminated glass 140 is a windshield, the interlayer 143 may have a wedge shape in cross section, in which the plate thickness becomes greater from the lower end toward the upper end of the windshield in a state of the windshield being attached to the vehicle. In this case, if the plate thickness of the glass plates 141 and 142 is constant, the wedge angle of the interlayer 143 may be varied within a range of, for example, greater than 0 mrad and less than or equal to 1.0 mrad.

Note that the interlayer 143 may be formed of multiple layers of interlayers. For example, by forming the interlayer 143 to have three interlayers, and making the Shore hardness of the middle layer lower than the Shore hardness of the layers on both outer sides by adjusting a plasticizer or the like, the sound insulation performance of the laminated glass can be improved. In this case, the hardness of the layers on both outer sides may be the same, or may be different from each other.

Also, in the case where the interlayer 143 is formed of multiple layers of interlayers, although it is desirable that all the layers are formed of the same material, some of the layers may be formed of different materials. However, from the viewpoint of adhesion between the glass plates 141 and 142 or functional materials to be contained in the laminated glass 140, it is desirable to use the materials described above by greater than or equal to 50% of the film thickness of the interlayer 143.

In order to produce an interlayer 143, for example, a resin material to form the interlayer is selected appropriately from among those described above, and in a heated and melted state, extruded to be formed by using an extruder. Extrusion conditions such as the extrusion speed of the extruder are set to be uniform. Thereafter, in order to impart curvatures on the upper side and on the lower side according to design of the laminated glass, for example, the resin film formed by the extrusion may be stretched as needed, to complete the interlayer 143.

[Laminated Glass]

The total thickness of the laminated glass 140 is favorably greater than or equal to 2.8 mm and less than or equal to 10 mm. As long as the total thickness of the laminated glass 140 is greater than or equal to 2.8 mm, sufficient rigidity can be ensured. Also, as long as the total thickness of the laminated glass 140 is less than or equal to 10 mm, sufficient transmittance can be obtained, and the haze can be reduced.

It is favorable for the laminated glass 140, in a state of being attached to the automobile 10, to have a radius of curvature in the horizontal direction and/or a radius of curvature in the vertical direction being greater than or equal to 500 mm and less than or equal to 100,000 mm. The radius of curvature in the horizontal direction and/or the radius of curvature in the vertical direction are more favorably greater than or equal to 500 mm and less than or equal to 50,000 mm.

In other words, the laminated glass 140 may have a single directionally curved shape curved only in either of the horizontal direction or the vertical direction, or may have a multi-directionally curved shape curved in both the horizontal direction and vertical direction. In other words, in the case where the laminated glass has a single directionally curved shape, in a state of being attached to the automobile 10, the radius of curvature in the horizontal direction or the radius of curvature in the vertical direction is favorably greater than or equal to 500 mm and less than or equal to 100,000 mm, and more favorably greater than or equal to 500 mm and less than or equal to 50,000 mm.

In the case where the laminated glass 140 has a multi-directionally curved shape, the radius of curvature in the horizontal direction and the radius of curvature in the vertical direction may be the same or may be different from each other. In other words, in the case where the laminated glass has a multi-directionally curved shape, in a state of having been attached to the automobile 10, the radius of curvature in the horizontal direction and the radius of curvature in the vertical direction are favorably greater than or equal to 500 mm and less than or equal to 100,000 mm, and more favorably greater than or equal to 500 mm and less than or equal to 50,000 mm.

As long as the radii of curvatures of the laminated glass 140 in the horizontal direction and in the vertical direction are greater than or equal to 500 mm, the focus of a light beam from the projection device 16 with which the laminated glass 140 is irradiated can be easily adjusted to the scattering layer 150. The radii of curvatures of the laminated glass 140 in the horizontal direction and in the vertical direction are favorably greater than or equal to 1,000 mm, and more favorably greater than or equal to 2,000 mm.

Also, in the case where the radii of curvatures of the laminated glass 140 in the horizontal direction and in the vertical direction are less than or equal to 100,000 mm, and the laminated glass 140 is convex on the vehicle exterior side, sunlight incident from the vehicle exterior side is reflected on and diverged in the laminated glass 140; therefore, the quantity of light of reflected light in a specific direction can be reduced. Also, in this case, the laminated glass 140 is concave on the vehicle interior side; therefore, light incident from the projection device 16 can be collected easier. The radii of curvatures of the laminated glass 140 in the horizontal direction and in the vertical direction are favorably less than or equal to 50,000 mm, and more favorably less than or equal to 40,000 mm.

Along at least one side of the laminated glass 140, the plate misalignment between the glass plate 141 and the glass plate 142 is favorably less than or equal to 1.5 mm, and more favorably less than or equal to 1 mm. Here, the plate misalignment between the glass plate 141 and the glass plate 142 is the amount of misalignment between an edge of the glass plate 141 and a corresponding edge of the glass plate 142 in plan view.

Along at least one side of the laminated glass 140, as long as the plate misalignment between the glass plate 141 and the glass plate 142 is less than or equal to 1.5 mm, it is favorable in terms of not impairing the external appearance, and it is more favorable to be less than or equal to 1.0 mm.

Between the glass plate 141 and the glass plate 142, to an extent not impairing the effects of the present application, in addition to the interlayer 143 and the scattering layer 150, films and/or devices that have functions of heating wire, infrared reflection, light emission, power generation, light control, touch panel, visible light reflection, scattering, decoration, absorption, and the like may be provided.

Also, on the surface on the vehicle interior side of the glass plate 141 and/or the surface on the vehicle exterior side of the glass plate 142, films having functions of anti-fogging, water-repellency, heat shielding, low reflection, and the like may be provided. Also, on the surface on the vehicle interior side of the glass plate 141 and/or the surface on the vehicle exterior side of the glass plate 142, films having functions of heat shielding, heat generation, and the like may be provided.

Also, on the surface on the vehicle interior side of the glass plate 141 and/or the surface on the vehicle exterior side of the glass plate 142, anti-reflective coating may be applied. This further improves the contrast between an image and the background (the brightness of the image/the brightness of the background).

In the case where the laminated glass 140 is applied to a windshield, in plan view of the windshield, a shielding layer may be provided in a peripheral area of the laminated glass 140, for example, in a band shape. The shading layer is, for example, an opaque, colored (e.g., black) ceramic layer. The presence of the opaque shading layer in the windshield can prevent degradation of members including an adhesive member such as urethane to hold the peripheral portion of the windshield to be attached to the vehicle body, an adhesive member to attach a bracket that locks a device to the windshield, and the like, due to ultraviolet light.

The shading layer can be formed by, for example, applying ceramic color paste containing meltable glass frit containing a black pigment onto a glass surface by screen printing or the like, and baking it, but not limited as such. The shielding layer may be formed by, for example, applying organic ink containing a black or dark pigment onto a glass plate, such as by screen printing, and then, drying.

The shielding layer may be a colored interlayer or a colored film having a light shielding property, or a combination of a colored interlayer and a colored film. The colored film may be integrated with an infrared reflective film or the like.

The shielding layer is provided, for example, on the surface on the vehicle interior side of the glass plate 141. However, as necessary, the shading layer may be provided on a surface of the glass plate 142 on the vehicle interior side, or may be provided on both the surface of the glass plate 141 on the vehicle interior side and the surface of the glass plate 142 on the vehicle interior side.

In order to manufacture a laminated glass 140, an interlayer 143 and a scattering layer 150 are interposed between a glass plate 141 and a glass plate 142, so as to form a laminate. Then, for example, the laminate is placed in a rubber bag, to be bonded in a vacuum whose pressure is controlled to be within a range of −65 to −100 kPa at a temperature controlled to be within a range of around 70 to 110° C. The heating conditions, temperature conditions, and laminating method are suitably selected in consideration of the characteristics of the scattering layer 150, for example, so as not to be degraded during the laminating process.

Further, for example, by applying a joining treatment that applies heating and pressing to the laminate under conditions of, for example, 100 to 150° C. and a pressure of 0.6 to 1.3 MPa, a laminated glass 140 having more excellent durability can be obtained. However, in some cases, this heating and pressing process is not used, in consideration of simplifying the process, and of the characteristics of the materials enclosed into the laminated glass 140.

[Visibility of Image from the Outside of the Vehicle]

Next, a range within which a light beam emitted on the laminated glass from the projection device can be visually recognized as an image from the outside of the vehicle, will be described.

Figure 8:
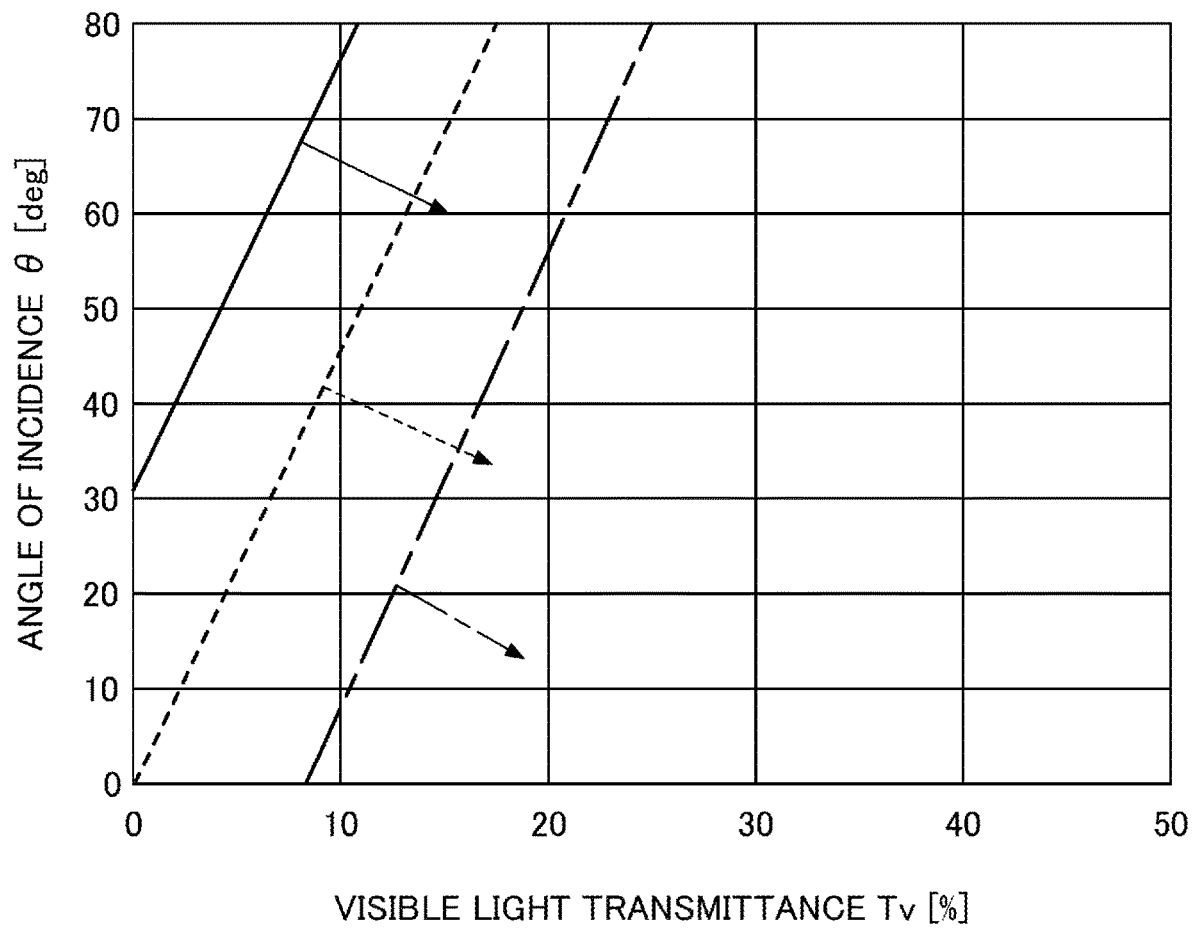
FIG. 8 is a diagram illustrating a relationship among the visible light transmittance of a laminated glass, the angle of incidence of light incident on a scattering layer, and the visibility of an image from the outside of a vehicle.
Figure 8:
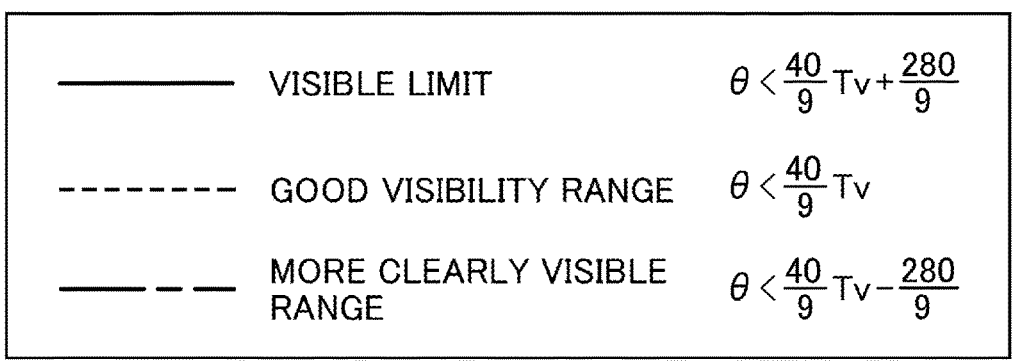

FIG. 8 is a diagram illustrating a relationship among the visible light transmittance of a laminated glass, the angle of incidence of light incident on a scattering layer, and the visibility of an image from the outside of a vehicle.

The angle of incidence θ in FIG. 8 is an angle formed between a light ray incident on the irradiation surface 150a of the scattering layer 150, and a normal to the irradiation surface 150a. The angle of incidence θ takes values that are different from ray to ray included in the light beam from the projection device 16. The angle of incidence θ is obtained by, for example, measuring an angle formed by a normal to the glass, and a straight line connecting the light source of the projection device 16 to an image reflecting position on the glass. Note that the normal to the glass may be directed in the thickness direction of the glass at a predetermined position (point) on the surface of the glass.

In FIG. 8, the visible light transmittance Tv is a ratio of the total quantity of light that transmitted through the laminated glass 140, to the quantity of light before entering the laminated glass 140 with an angle of incidence θ=0 degrees on the irradiation surface 150a of the scattering layer 150. Note that the visible light transmittance Tv can be measured according to JIS R 3106:1998.

The relationship in FIG. 8 was derived by the inventors through repeated experiments. This will be described below.

In order to make a light beam from the projection device 16 with which the laminated glass 140 is irradiated be visible as an image from the outside of the vehicle, and to further improve the visibility, the contrast C may be increased, by increasing the brightness of the image, by decreasing the brightness of the background, or by doing both. Here, the contrast C is the brightness of the image/the brightness of the background, and the same applies to the following description.

However, in order to decrease the brightness of the background, the visible light transmittance Tv of the laminated glass 140 needs to be decreased, and in order to increase the brightness of the image, the visible light transmittance Tv of the laminated glass 140 needs to be increased, and hence, these are not compatible.

Meanwhile, in the case where the projection device 16 is arranged in a vehicle, to have the laminated glass 140 irradiated with a light beam, the position to install the projection device 16 is limited; therefore, it is difficult to arrange the projection device 16 such that the light beam is incident on the laminated glass 140 perpendicularly. Therefore, the light beam from the projection device 16 is incident on the laminated glass 140 obliquely at an angle of incidence θ (θ≠0). Therefore, even with the same visible light transmittance Tv, a greater angle of incidence θ makes the brightness of the image smaller. This is because a greater angle of incidence θ causes the light incident on the laminated glass 140 to pass through a longer optical path length through the laminated glass 140, and thereby, the quantity of light transmitted through the laminated glass 140 becomes smaller. On the other hand, the brightness of the background remains the same as long as the visible light transmittance Tv of the laminated glass 140 is the same.

Thereupon, the inventors paid attention to a fact that the brightness of an image depends on the visible light transmittance Tv of the laminated glass 140 and the angle of incidence θ, whereas the brightness of the background depends only on the visible light transmittance Tv of the laminated glass 140. Then, in order to make a light beam from the projection device 16 with which the laminated glass 140 is irradiated be visible as an image from the outside of the vehicle, and to further improve the visibility, the inventors considered that the visible light transmittance Tv and the angle of incidence θ need to satisfy a predetermined relationship, and repeated experiments.

Specifically, the inventors tested, while changing the visible light transmittance Tv and the angle of incidence θ to take various values, to what extent images corresponding to emitted light beams became visible, by having the laminated glass 140 irradiated with light beams from the projection device 16 that was installed in the vehicle and had a predetermined brightness (lumen), at a position at a predetermined distance on the vehicle exterior side of the laminated glass 140.

As a result, the inventors derived a fact that a certain visibility was obtained in each of the three-stages of ranges that are delimited in FIG. 8 by a solid line, a broken line, and an alternate long and short dash line.

The solid line in FIG. 8 designates a limit at which a light beam from the projection device 16 installed in the vehicle with which the laminated glass 140 is irradiated is visible as an image from the outside of the vehicle. In FIG. 8, a solid line arrow side with respect to the solid line indicates a range in which a light beam from the projection device 16 installed in the vehicle with which the laminated glass 140 is irradiated is visible as an image from the outside of the vehicle, and this range can be expressed by the following Formula (1).

[Formula 1]

$$\theta < \frac{40}{9}Tv + \frac{280}{9} \qquad (1)$$

The broken line in FIG. 8 designates a boundary at which a light beam from the projection device 16 installed in the vehicle with which the laminated glass 140 is irradiated becomes to have better visibility as an image from the outside of the vehicle. In FIG. 8, a broken line arrow side with respect to the broken line indicates a range in which a light beam from the projection device 16 installed in the vehicle with which the laminated glass 140 is irradiated becomes to have better visibility as an image from the outside of the vehicle, and this range can be expressed by the following Formula (2).

[Formula 2]

$$\theta < \frac{40}{9}Tv \qquad (2)$$

The alternate long and short dash line in FIG. 8 designates a boundary at which a light beam from the projection device 16 installed in the vehicle with which the laminated glass 140 is irradiated becomes clearly visible as an image from the outside of the vehicle. In FIG. 8, an alternate long and short dash line arrow side with respect to the alternate long and short dash line indicates a range in which a light beam from the projection device 16 installed in the vehicle with which the laminated glass 140 is irradiated becomes clearly visible as an image from the outside of the vehicle, and this range is can be expressed by the following Formula (3).

[Formula 3]
$$\theta < \frac{40}{9}Tv - \frac{280}{9} \quad (3)$$

In this way, by having the visible light transmittance Tv (%) of the laminated glass 140, and the angle of incidence θ (degrees) of each ray included in a light beam incident on the irradiation surface 150a of the scattering layer 150, satisfy a relationship expressed as Formula (1), a good contrast C can be obtained. As a result, a light beam from the projection device 16 installed in the vehicle with which the laminated glass 140 is irradiated can be viewed as an image from the outside of the vehicle. Also, by satisfying Formula (2), the contrast C becomes higher, and thereby, the visibility of the image from the outside of the vehicle is improved; and by satisfying Formula (3), the contrast C becomes further higher, and thereby, the visibility of the image from the outside of the vehicle is further improved. These are facts firstly found by the inventors, and have been unknown previously.

Note that in order to demonstrate the effects described above, the visible light transmittance Tv and all of the angles of incidence θ need to satisfy the respective formulas. In other words, the visible light transmittance Tv and all of the angles of incidence θ satisfying the respective formulas demonstrate the effects described above.

In the laminated glass 140, in the case where a normal to the surface on the vehicle exterior side of the glass plate 142 positioned on the vehicle exterior side wherein the normal passes through the center of gravity of the laminated glass 140, is tilted by greater than or equal to (+)1 degree in a direction toward the sky with respect to the ground, the effects of the present inventive concept are notable.

Here, "normal to the surface on the vehicle exterior side of the glass plate 142 wherein the normal passes through the center of gravity of the laminated glass 140" can also be stated as a thickness direction of the laminated glass 140 that passes through the center of gravity of the laminated glass 140 and the surface on the vehicle exterior side of the glass plate 142. Also, the direction of the normal corresponds to the direction of a vector extending from the vehicle interior side to the vehicle exterior side in the thickness direction described above that passes through the center of gravity of the laminated glass 140 and the surface on the vehicle exterior side of the glass plate 142. Further, the "direction toward the sky with respect to the ground" corresponds to a direction in which the angle of elevation of the vector described above takes a positive value with respect to the ground (horizontal plane). On the other hand, a direction in which the angle of elevation of the vector described above takes a negative value with respect to the ground (horizontal plane) corresponds to a direction in which the vector described above reaches the ground.

In other words, in such a case (where the normal to the surface positioned on the vehicle exterior side at the center of gravity being tilted by greater than or equal to (+)1 degree in a direction toward the sky with respect to the ground), reflection of the sky increases on the laminated glass 140; therefore, it becomes difficult to visually recognize an image from the outside of the vehicle. Even in such a case, by satisfying Formula (1), a light beam from the projection device 16 installed in the vehicle with which the laminated glass 140 is irradiated can be visible as an image from the outside of the vehicle. Also, by satisfying Formula (2), the visibility of the image from the outside of the vehicle is improved, and by satisfying Formula (3), the visibility of the image from the outside of the vehicle is further improved.

In the following, in the laminated glass 140, the slope of the normal to the surface on the vehicle exterior side of the glass plate 142 positioned on the vehicle exterior side wherein the normal passes through the center of gravity the laminated glass 140 in a direction toward the sky with respect to the ground, is defined as angle φ. In the case where the angle φ of the laminated glass 140 is less than or equal to (+)45 degrees, the visibility of the image from the outside of the vehicle is satisfactory. In other words, in such a case, the angle of incidence of external light such as sunlight to the laminated glass 140 is reduced; therefore, the reflection of sky is reduced, and the visible light reflectance becomes smaller. Therefore, the visibility of an image from the outside of the vehicle is improved.

In order to further improve the visibility of an image from the outside of the vehicle, the angle φ of the laminated glass 140 is favorably less than or equal to 30 degrees, more favorably less than or equal to 15 degrees, and particularly favorably less than or equal to 5 degrees.

Note that in the present specification, the visible light reflectance Rv is a ratio of the total quantity of light reflected on the laminated glass 140, to the quantity of light before entering the laminated glass 140 with an angle of incidence θ=2 degrees on the irradiation surface 150a of the scattering layer 150. Note that the visible light reflectance Rv can be measured according to JIS R 3106:1998. Here, the visible light reflectance Rv of the laminated glass 140 may be less than or equal to 15%, favorably less than or equal to 10%, more favorably less than or equal to 5%, further favorably less than or equal to 3%, and most favorably less than or equal to 1%.

Modified Example of First Embodiment

In a modified example of the first embodiment, an example will be described in which the laminated glass has a visible light transmittance reducing unit. Note that in the modified example of the first embodiment, descriptions of the same elements as in the embodiment described already may be omitted.

For the purposes of indoor comfort, reduction of air conditioning loads, selection of color tones that gives a sense of luxury, and protection of privacy in the vehicle, there are cases where it is desirable to lower the visible light transmittance Tv of the laminated glass. In such a case, the laminated glass may have a visible light transmittance reducing unit.

As no legal regulations in terms of the visible light transmittance are specified for the rear side glass, rear glass, roof glass, and the like, any visible light transmittance can be set for these glasses. Thereupon, in the case of applying the laminated glass 140 to the rear side glass 14L, the visible light transmittance Tv of the laminated glass 140 may be reduced. The visible light transmittance Tv of the laminated glass 140 can be set to, for example, greater than or equal to 0.1% and less than or equal to 35%, and more favorably greater than or equal to 10% and less than or equal to 35%.

In order to reduce the visible light transmittance Tv of the laminated glass 140, for example, what is called privacy glass (also referred to as dark grey glass) having a reduced visible light transmission may be used on one or both of the glass plates 141 and 142. In this case, one or both of the glass plates 141 and 142 also serve as the visible light transmittance reducing unit.

The reduction of the visible light transmittance Tv can be achieved by, for example, adjusting the total iron content converted to $Fe_2O_3$ in one or both of the glass plates 141 and 142. Privacy glass is described in detail, for example, in International Publication No. 2015/088026, the contents of which can be incorporated herein by reference.

Note that in the case where privacy glass is used for either one of the glass plates 141 and 142, it is favorable to use the privacy glass for the glass plate 141 on the vehicle interior side. The visible light transmittance reducing unit being arranged closer to the vehicle interior side than the scattering layer 150, reduces the brightness of the background, and increases the contrast C; therefore, the visibility of the image from the outside of the vehicle is improved.

In order to reduce the visible light transmittance Tv of the laminated glass 140, instead of using privacy glass, the visible light transmittance reducing unit may be enclosed in the interlayer 143 in addition to the scattering layer 150.

Figure 9:
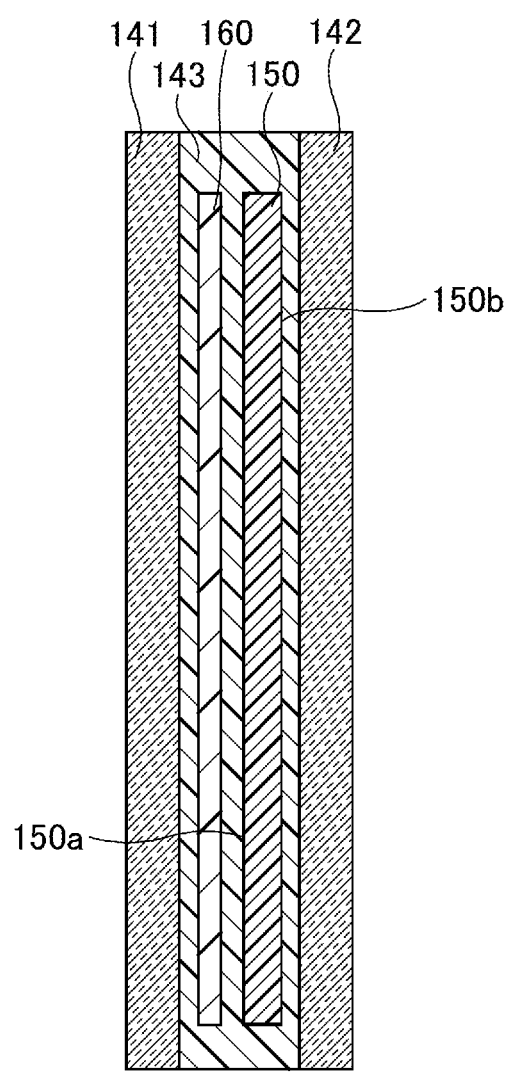
FIG. 9 is a cross sectional view exemplifying a laminated glass according to a modified example of the first embodiment.

FIG. 9 is a cross sectional view exemplifying a laminated glass according to a modified example of the first embodiment. In FIG. 9, for the sake of convenience of description, a laminated glass 240 is illustrated with omitting an actual curved shape.

Instead of the laminated glass 140 according to the first embodiment, the laminated glass 240 may be applied to the rear side glass 14L. In this case, a light beam from the projection device 16 installed in the vehicle emitted on the laminated glass 240 as the rear side glass 14L, transmits toward the vehicle exterior side, and can be visually recognized as an image from the outside of the vehicle.

As illustrated in FIG. 9, the laminated glass 240 has, in addition to the scattering layer 150, a visible light transmittance reducing unit 160 enclosed in the interlayer 143, and in this regard, differs from the laminated glass 140 (see FIGS. 4 and 5). As the visible light transmittance reducing unit 160, for example, a resin film such as a smoke film may be enumerated.

Although the visible light transmittance reducing unit 160 may be arranged either on the vehicle interior side or on the vehicle exterior side with respect to the scattering layer 150, if arranged closer to the vehicle interior side than the scattering layer 150 is, the brightness of the background is reduced, and the contrast C is increased; therefore, such arrangement is favorable in terms of the visibility of the image from the outside of the vehicle being improved.

Alternatively, the interlayer 143 may have a color of dark grey or the like to reduce the visible light transmittance of the interlayer 143 itself. In this case, the interlayer 143 also serves as the visible light transmittance reducing unit. Alternatively, the visible light transmittance of the scattering layer 150 may be reduced to serve as the visible light transmittance reducing unit.

In this way, in some cases, it may be desirable to reduce the visible light transmittance Tv in the window glass of the automobile 10. As can be seen in FIG. 8, in the case of the visible light transmittance Tv being low, the visibility of an image from the outside of the vehicle becomes worse depending on the angle of incidence θ; therefore, the technical significance is great to satisfy Formula (1), Formula (2), and Formula (3).

EXAMPLES

In the following, application examples will be described; note that the present inventive concept is not limited in any way to these examples.

Example 1

A first glass plate serving as the outer plate (vehicle-exterior-side glass plate) and a second glass plate serving as the inner plate (vehicle-interior-side glass plate) when formed as a laminated glass were prepared (both manufactured by AGC Inc., commonly known as FL). The dimensions of the first and second glass plates were both set to be 300 mm×300 mm×plate thickness of 2 mm.

Next, an interlayer (PVB manufactured by Sekisui Chemical Co., Ltd., having a thickness of 0.76 mm) was prepared. Then, a laminate was produced by having the interlayer and a transparent screen film as the scattering layer interposed between the first glass plate and the second glass plate, and then, placed in a rubber bag, to be bonded in a vacuum controlled to be within a range of −65 to −100 kPa, at a temperature range of approximately 70 to 110° C. Then, pressurization and heating was applied to the laminate under conditions controlled to have pressure of 0.6 to 1.3 MPa and temperature of approximately 100 to 150° C., to produce a laminated glass A for evaluation having a cross sectional structure illustrated in FIG. 5.

Then, the Landolt rings having the predetermined gaps were projected onto the laminated glass A for evaluation from the second glass plate side, so that the maximum angle of incidence θ from the projection device became 50 degrees, to determine whether a gap of a Landolt ring could be visually recognized from 1 m ahead of the laminated glass A for evaluation on the first glass plate side. Determination was made by an experimenter having visual acuity of greater than or equal to 1.5. The determination criteria were as follows.

A case where a Landolt ring corresponding to visual acuity of 1.0 (predetermined gap=0.29 mm) could not be visually recognized was classified as "Failing". Also, a case where the Landolt ring corresponding to visual acuity of 1.0 (predetermined gap=0.29 mm) could be visually recognized, and a Landolt ring corresponding to visual acuity of 1.2 (predetermined gap=0.24 mm) could not be visually recognized was classified as "Passing: Fair".

Also, a case where the Landolt ring corresponding to visual acuity of 1.2 (predetermined gap=0.24 mm) could be visually recognized, and a Landolt ring corresponding to visual acuity of 1.5 (predetermined gap=0.19 mm) could not be visually recognized was classified as "Passing: Good". Also, a case where the Landolt ring corresponding to visual acuity of 1.5 (predetermined gap=0.19 mm) could be visually recognized was classified as "Passing: Excellent".

Note that the laminated glass A for evaluation exhibited a visible light transmittance Tv of 1% and a contrast C of 0.21.

Example 2

A laminated glass B for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass B for evaluation from the second glass plate side, so that the maximum angle of incidence θ from the projection device became 70 degrees, to determine whether a gap of a Landolt ring could be visually recognized from 1 m ahead of the laminated glass B for evaluation on the first glass plate side. The determination criteria were the same as in Example 1.

Note that the laminated glass B for evaluation exhibited a visible light transmittance Tv of 5% and a contrast C of 0.20.

Example 3

A laminated glass C for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass C for evaluation from the second glass plate side, so that the maximum angle of incidence $\theta$ from the projection device became 50 degrees, to determine whether a gap of a Landolt ring could be visually recognized from 1 m ahead of the laminated glass C for evaluation on the first glass plate side. The determination criteria were the same as in Example 1.

Note that the laminated glass C for evaluation exhibited a visible light transmittance Tv of 5% and a contrast C of 0.28.

Example 4

A laminated glass D for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass D for evaluation from the second glass plate side, so that the maximum angle of incidence $\theta$ from the projection device became 60 degrees, to determine whether a gap of a Landolt ring could be visually recognized from 1 m ahead of the laminated glass D for evaluation on the first glass plate side. The determination criteria were the same as in Example 1.

Note that the laminated glass D for evaluation exhibited a visible light transmittance Tv of 10% and a contrast C of 0.27.

Example 5

A laminated glass E for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass E for evaluation from the second glass plate side, so that the maximum angle of incidence $\theta$ from the projection device became 50 degrees, to determine whether a gap of a Landolt ring could be visually recognized from 1 m ahead of the laminated glass E for evaluation on the first glass plate side. The determination criteria were the same as in Example 1.

Note that the laminated glass E for evaluation exhibited a visible light transmittance Tv of 15% and a contrast C of 0.33.

Example 6

A laminated glass F for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass F for evaluation from the second glass plate side, so that the maximum angle of incidence $\theta$ from the projection device became 40 degrees, to determine whether a gap of a Landolt ring could be visually recognized from 1 m ahead of the laminated glass F for evaluation on the first glass plate side. The determination criteria were the same as in Example 1.

Note that the laminated glass F for evaluation exhibited a visible light transmittance Tv of 10% and a contrast C of 0.36.

Example 7

A laminated glass G for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass G for evaluation from the second glass plate side, so that the maximum angle of incidence $\theta$ from the projection device became 30 degrees, to determine whether a gap of a Landolt ring could be visually recognized from 1 m ahead of the laminated glass G for evaluation on the first glass plate side. The determination criteria were the same as in Example 1.

Note that the laminated glass G for evaluation exhibited a visible light transmittance Tv of 30% and a contrast C of 0.42.

Example 8

A laminated glass H for evaluation having the cross sectional structure illustrated in FIG. 5 was produced in substantially the same way as in Example 1 except that the characteristics of the transparent screen film were changed. Then, the Landolt rings having the predetermined gaps were projected onto the laminated glass H for evaluation from the second glass plate side, so that the maximum angle of incidence $\theta$ from the projection device became 50 degrees, to determine whether a gap of a Landolt ring could be visually recognized from 1 m ahead of the laminated glass H for evaluation on the first glass plate side. The determination criteria were the same as in Example 1.

Note that the laminated glass H for evaluation exhibited a visible light transmittance Tv of 60% and a contrast C of 0.42.

[Example 9] to [Example 13]

Laminated glasses I to M for evaluation each having the cross sectional structure illustrated in FIG. 5 were produced in substantially the same way as in Example 1 except that the characteristics of the transparent screen film were changed. Then, the Landolt rings having the predetermined gaps were projected onto each of the laminated glasses I to M for evaluation from the second glass plate side, so that the maximum angle of incidence $\theta$ from the projection device became 30 degrees, to determine whether a gap of a Landolt ring could be visually recognized from 1 m ahead of each of the laminated glasses I to M for evaluation on the first glass plate side. The determination criteria were the same as in Example 1. Note that in [Example 9] to [Example 13], the visible light reflectance Rv was also measured for each of the laminated glasses I to M for evaluation.

[Example 14] to [Example 18]

Laminated glasses N to R for evaluation each having the cross sectional structure illustrated in FIG. 5 were produced in substantially the same way as in Example 1 except that the characteristics of the transparent screen film were changed. Then, each of the laminated glasses N to R for evaluation was attached to a vehicle body so that the angle φ became 0 to 60 degrees. The Landolt rings having the predetermined gaps were projected onto each of the laminated glasses N to R for evaluation from the second glass plate side, so that the maximum angle of incidence θ from the projection device became 30 degrees, to determine whether a gap of a Landolt ring could be visually recognized from 1 m ahead of each of the laminated glasses N to R for evaluation on the first glass plate side. The determination criteria were the same as in Example 1. Note that in [Example 14] to [Example 18], the visible light reflectance Rv was also measured for each of the laminated glasses N to R for evaluation.

[Example 19] to [Example 24]

Laminated glasses S to X for evaluation each having the cross sectional structure illustrated in FIG. 5 were produced in substantially the same way as in Example 1 except that the radius of curvature in the vertical direction of the laminated glass was changed within a range of 300 mm to 60,000 mm. The Landolt rings having the predetermined gaps were projected onto each of the laminated glasses S to X for evaluation from the second glass plate side, so that the maximum angle of incidence θ from the projection device became 30 degrees, to determine whether a gap of a Landolt ring could be visually recognized from 1 m ahead of each of the laminated glasses S to X for evaluation on the first glass plate side. The determination criteria were the same as in Example 1. Note that each of the laminated glasses S to X for evaluation exhibited a visible light transmittance Tv of 20%, and a visible light reflectance Rv of 3%.

[Test Results]

For Examples 1 to 8, the visible light transmittance Tv, the angle of incidence θ, the contrast C, and the evaluation results of visibility were summarized in Table 1. Also, for Examples 1 to 8, whether the visible light transmittance Tv and the angle of incidence θ satisfied Formula (1) to Formula (3) described above was determined, and summarized in Table 1. In Table 1, a case where a formula was satisfied is indicated as "Satisfied", and a case where a formula was not satisfied is indicated as "Unsatisfied".

TABLE 1

| | Visible light transmittance Tv [%] | Angle of incidence θ [deg] | Contrast C | Evaluation result of visibility | Formula (1) | Formula (2) | Formula (3) |
|---|---|---|---|---|---|---|---|
| Ex. 1 | 1 | 50 | 0.21 | Failing | Unsatisfied | Unsatisfied | Unsatisfied |
| Ex. 2 | 5 | 70 | 0.2 | Failing | Unsatisfied | Unsatisfied | Unsatisfied |
| Ex. 3 | 5 | 50 | 0.28 | Fair | Satisfied | Unsatisfied | Unsatisfied |
| Ex. 4 | 10 | 60 | 0.27 | Fair | Satisfied | Unsatisfied | Unsatisfied |
| Ex. 5 | 15 | 50 | 0.33 | Good | Satisfied | Satisfied | Unsatisfied |
| Ex. 6 | 10 | 40 | 0.36 | Good | Satisfied | Satisfied | Unsatisfied |
| Ex. 7 | 30 | 30 | 0.42 | Excellent | Satisfied | Satisfied | Satisfied |
| Ex. 8 | 60 | 50 | 0.42 | Excellent | Satisfied | Satisfied | Satisfied |

As shown in Table 1, it could be confirmed that the visibility of an image projected from the inside of the vehicle that was determined outside the vehicle varies depending on the visible light transmittance Tv and the angle of incidence θ; satisfying Formula (1) makes it visible, satisfying Formula (2) improves the visibility, and satisfying Formula (3) further improves the visibility. Also, it could be confirmed that a contrast C of greater than or equal to a predetermined value makes it visible, and a higher contrast C results in a more improved visibility.

For Examples 9 to 12, the visible light transmittance Tv, the visible light reflectance Rv, the angle of incidence θ, the contrast C, and the evaluation results of visibility were summarized in Table 2. Also, for Examples 9 to 12, whether the visible light transmittance Tv and the angle of incidence θ satisfied Formula (1) to Formula (3) described above was determined, and summarized in Table 2. In Table 2, a case where a formula was satisfied is indicated as "Satisfied", and a case where a formula was not satisfied is indicated as "Unsatisfied".

TABLE 2

| | Visible light transmittance Tv [%] | Visible light reflectance Rv [%] | Angle of incidence θ [deg] | Contrast C | Evaluation result of visibility | Formula (1) | Formula (2) | Formula (3) |
|---|---|---|---|---|---|---|---|---|
| Ex. 9 | 20 | 1 | 30 | 0.40 | Excellent | Satisfied | Satisfied | Satisfied |
| Ex. 10 | 20 | 5 | 30 | 0.34 | Good | Satisfied | Satisfied | Satisfied |
| Ex. 11 | 20 | 10 | 30 | 0.28 | Fair | Satisfied | Satisfied | Satisfied |
| Ex. 12 | 20 | 15 | 30 | 0.24 | Fair | Satisfied | Satisfied | Satisfied |

As shown in Table 2, it could be confirmed that a visible light reflectance Rv of less than or equal to a predetermined value makes it visible, and a smaller visible light reflectance Rv results in a more improved visibility.

For Examples 13 to 16, the visible light transmittance Tv, the visible light reflectance Rv, the angle of incidence θ, the angle φ, the contrast C, and the evaluation results of visibility were summarized in Table 3. Also, for Examples 13 to 16, whether the visible light transmittance Tv and the angle of incidence θ satisfied Formula (1) to Formula (3) described above was determined, and summarized in Table 3. In Table 3, a case where a formula was satisfied is indicated as "Satisfied", and a case where a formula was not satisfied is indicated as "Unsatisfied".

TABLE 3

| | Visible light transmittance Tv [%] | Visible light reflectance Rv [%] | Angle of incidence θ [deg] | Angle φ [deg] | Contrast C | Evaluation result of visibility | Formula (1) | Formula (2) | Formula (3) |
|---|---|---|---|---|---|---|---|---|---|
| Ex. 13 | 20 | 3 | 30 | 0 | 0.37 | Excellent | Satisfied | Satisfied | Satisfied |
| Ex. 14 | 20 | 3 | 30 | 5 | 0.36 | Good | Satisfied | Satisfied | Satisfied |
| Ex. 15 | 20 | 3 | 30 | 10 | 0.36 | Good | Satisfied | Satisfied | Satisfied |
| Ex. 16 | 20 | 3 | 30 | 30 | 0.28 | Fair | Satisfied | Satisfied | Satisfied |

As shown in Table 3, it could be confirmed that an angle φ of the laminated glass of less than or equal to a predetermined value makes it visible, and a smaller angle φ results in a better visibility.

For Examples 17 to 22, the visible light transmittance Tv, the visible light reflectance Rv, the angle of incidence θ, the radius of curvature in the vertical direction of the laminated glass, and the evaluation results in terms of the visibility were summarized in Table 4. Also, for Examples 17 to 22, whether the visible light transmittance Tv and the angle of incidence θ satisfied Formula (1) to Formula (3) described above was determined, and summarized in Table 4. In Table 4, a case where a formula was satisfied is indicated as "Satisfied", and a case where a formula was not satisfied is indicated as "Unsatisfied".

TABLE 4

| | Visible light transmittance Tv [%] | Visible light reflectance Rv [%] | Angle of incidence θ [deg] | Radius of curvature in vertical direction [mm] | Evaluation result of visibility | Formula (1) | Formula (2) | Formula (3) |
|---|---|---|---|---|---|---|---|---|
| Ex. 17 | 20 | 3 | 30 | 300 | Fair | Satisfied | Satisfied | Satisfied |
| Ex. 18 | 20 | 3 | 30 | 500 | Good | Satisfied | Satisfied | Satisfied |
| Ex. 19 | 20 | 3 | 30 | 1000 | Excellent | Satisfied | Satisfied | Satisfied |
| Ex. 20 | 20 | 3 | 30 | 5000 | Excellent | Satisfied | Satisfied | Satisfied |
| Ex. 21 | 20 | 3 | 30 | 40000 | Good | Satisfied | Satisfied | Satisfied |
| Ex. 22 | 20 | 3 | 30 | 60000 | Fair | Satisfied | Satisfied | Satisfied |

As shown in Table 4, it could be confirmed that the visuality of an image projected from inside of the vehicle that was determined outside the vehicle varies depending on the radius of curvature of the laminated glass in the vertical direction, and if the radius of curvature is greater than or equal to a predetermined value and less than or equal to a predetermined value, the image can be visually recognized.

As above, the favorable embodiments and the like have been described in detail; note that the present inventive concept is not limited to the embodiments and the like described above, and without deviating from the scope described in the claims, the embodiments and the like described above can be changed and replaced in various ways.

The invention claimed is:

1. A vehicle, comprising:
a projection device; and
a window glass selected from one of a side glass, a rear glass, a roof glass, a front vent glass and a rear quarter glass and comprising a laminated glass configured to transmit a light beam emitted from the projection device to a vehicle exterior side and having a curved shape having at least one of a radius of curvature in a range of 500 mm to 100,000 mm in a horizontal direction and a radius of curvature in a range of 500 mm to 100,000 mm in a vertical direction such that the projection device is configured to project an image visually recognized from the vehicle exterior side, wherein the laminated glass includes a vehicle-interior-side glass plate, a vehicle-exterior-side glass plate, an interlayer bonding the vehicle-interior-side glass plate and the vehicle-exterior-side glass plate, and a scattering layer interposed between the vehicle-exterior-side glass plate and the vehicle-interior-side glass plate such that the scattering layer is in contact with the interlayer and configured to be irradiated with the light beam emitted from the projection device, and the laminated glass has visible light transmittance Tv in a range of 0.1% to 35% and is formed such that a relationship between the visible light transmittance Tv of the laminated glass and an angle of incidence θ to the scattering layer of each ray in the light beam incident on the scattering layer satisfies Formula (1), $$\theta < \frac{40}{9}Tv + \frac{280}{9} \quad (1)$$

2. The vehicle as claimed in claim 1, wherein the relationship between the visible light transmittance Tv of the laminated glass and the angle of incidence θ to the scattering layer of said each ray in the light beam incident on the scattering layer satisfies Formula (2), $$\theta < \frac{40}{9}Tv \quad (2)$$

3. The vehicle as claimed in claim 1, wherein the relationship between the visible light transmittance Tv of the laminated glass and the angle of incidence θ to the scattering layer of said each ray in the light beam incident on the scattering layer satisfies Formula (3), $$\theta < \frac{40}{9}Tv - \frac{280}{9}. \quad (3)$$

4. The vehicle as claimed in claim 1, wherein the scattering layer includes at least one of a transparent screen film, a light control film, a scattering coating, a fluorescent film, and a fluorescent coating.

5. The vehicle as claimed in claim 1, wherein the scattering layer has a thickness in a range of 3 μm to 800 μm.

6. The vehicle as claimed in claim 1, wherein the laminated glass further includes a visible light transmittance reducing unit that reduces the visible light transmittance Tv of the laminated glass.

7. The vehicle as claimed in claim 6, wherein the visible light transmittance reducing unit is positioned closer to a vehicle interior side than the scattering layer is.

8. The vehicle as claimed in claim 1, wherein the laminated glass is formed such that a normal to a surface on the vehicle-exterior-side glass plate passes through a center of gravity of the laminated glass and is tilted by 1 degree or greater in a direction toward sky with respect to ground.

9. The vehicle as claimed in claim 8, wherein the laminated glass is formed such that the normal is tilted in a range of 1 degree to 45 degrees in the direction toward the sky with respect to the ground.

10. The vehicle as claimed in claim 1, wherein the laminated glass has a single directionally curved shape having the radius of curvature in the horizontal direction or the radius of curvature in the vertical direction.

11. The vehicle as claimed in claim 1, wherein the laminated glass has a multi-directionally curved shape having the radius of curvature in a range of 500 mm to 100,000 mm in the horizontal direction and the radius of curvature in a range of 500 mm to 100,000 mm in the vertical direction.

12. The vehicle as claimed in claim 11, wherein the laminated glass has a multi-directionally curved shape having the radius of curvature in a range of 500 mm to 50,000 mm in the horizontal direction and the radius of curvature in a range of 500 mm to 50,000 mm in the vertical direction.

13. The vehicle as claimed in claim 11, wherein the laminated glass has a multi-directionally curved shape having the radius of curvature in a range of 500 mm to 40,000 mm in the horizontal direction and the radius of curvature in a range of 500 mm to 40,000 mm in the vertical direction.

14. The vehicle as claimed in claim 1, wherein the laminated glass is formed such that an outer peripheral edge of the scattering layer is positioned 5 mm or greater inward the laminated glass from an outer peripheral edge of the laminated glass.

15. The vehicle as claimed in claim 1, wherein the laminated glass has anti-reflective coating on a surface on a vehicle interior side of the vehicle-interior-side glass plate and/or a surface on the vehicle exterior side of the vehicle-exterior-side glass plate.

16. The vehicle as claimed in claim 1, wherein the laminated glass has a visible light reflectance Rv of 15% or less.

17. The vehicle as claimed in claim 1, wherein the laminated glass has the curved shape having at least one of the radius of curvature in a range of 500 mm to 50,000 mm in the horizontal direction and the radius of curvature in a range of 500 mm to 50,000 mm in the vertical direction.

18. The vehicle as claimed in claim 1, wherein the laminated glass has the curved shape having at least one of the radius of curvature in a range of 500 mm to 40,000 mm in the horizontal direction and the radius of curvature in a range of 500 mm to 40,000 mm in the vertical direction.

19. The vehicle as claimed in claim 1, wherein the laminated glass has the visible light transmittance Tv in a range of 10% to 35%.

20. The vehicle as claimed in claim 1, wherein the laminated glass has the visible light transmittance Tv in a range of 0.1% to 10%.

* * * * *